US011751655B2

(12) United States Patent
Kälin

(10) Patent No.: US 11,751,655 B2
(45) Date of Patent: Sep. 12, 2023

(54) STABILIZING DEVICE FOR A TELESCOPIC HANDLE OF A PIECE OF LUGGAGE

(71) Applicant: VICTORINOX AG, Ibach (CH)

(72) Inventor: Alexander Kälin, Seewen (CH)

(73) Assignee: VICTORINOX AG, Ibach (CH)

( * ) Notice: Subject to any disclaimer, the term of this patent is extended or adjusted under 35 U.S.C. 154(b) by 183 days.

(21) Appl. No.: 17/257,062

(22) PCT Filed: Sep. 30, 2020

(86) PCT No.: PCT/EP2020/077372
§ 371 (c)(1),
(2) Date: Dec. 30, 2020

(87) PCT Pub. No.: WO2020/249828
PCT Pub. Date: Dec. 17, 2020

(65) Prior Publication Data
US 2021/0267336 A1      Sep. 2, 2021

(30) Foreign Application Priority Data

Feb. 27, 2020 (EP) ..................................... 20159747

(51) Int. Cl.
*A45C 13/26*      (2006.01)
*F16B 7/04*       (2006.01)
(52) U.S. Cl.
CPC .......... *A45C 13/262* (2013.01); *F16B 7/0413* (2013.01); *A45C 2013/267* (2013.01)
(58) Field of Classification Search
CPC .......................... F16B 7/0413; A45C 2013/267

(Continued)

(56) References Cited

U.S. PATENT DOCUMENTS 3,687,499 A * 8/1972 Guilfoyle, Sr. ........ F16B 7/0413
                                                    403/292
5,488,756 A * 2/1996 Hsieh ................... A45C 13/262
                                                    280/655

(Continued)

FOREIGN PATENT DOCUMENTS

CN       106470569 A     3/2017
CN       109 793 327 A   5/2019

(Continued)

OTHER PUBLICATIONS

International Search Report for PCT/EP2020/077372 dated Nov. 6, 2020 [PCT/ISA/210].

(Continued)

*Primary Examiner* — Jennifer Robertson
*Assistant Examiner* — Justin Caudill
(74) *Attorney, Agent, or Firm* — Sughrue Mion, PLLC

(57) ABSTRACT

A stabilizing device (1) for a telescopic handle (2) having at least an outer handle element (4) and an inner handle element (5) having a device body (6) extending along a longitudinal direction (L) of the stabilizing device (1), an opening (7), and at least an inner stabilizing element (8, 8') and an outer stabilizing element (9, 9'). The inner stabilizing element (8, 8') and the outer stabilizing element (9, 9') are configured such that, in an installed position, wherein the inner handle element (5) is at least partially inserted into the stabilizing device (1) and the stabilizing device (1) is at least partially inserted into the outer handle element (4), the inner stabilizing element (8, 8') acts on the inner handle element (5) and the outer stabilizing element (9, 9') acts on the outer handle element (4).

26 Claims, 11 Drawing Sheets

(58) Field of Classification Search
USPC .................... 16/133.1, 405; 280/47.371
See application file for complete search history.

(56) References Cited

U.S. PATENT DOCUMENTS

| | | | | |
|---|---|---|---|---|
| 5,729,866 A | * | 3/1998 | Chg .................... | A45C 13/262 190/115 |
| 6,226,834 B1 | * | 5/2001 | Lu ....................... | A45C 13/262 280/655 |
| 6,338,587 B1 | * | 1/2002 | Kuo .................... | A45C 13/262 190/115 |
| 6,662,916 B2 | * | 12/2003 | Tiramani ............ | B60B 33/0049 16/113.1 |
| 9,161,600 B1 | * | 10/2015 | Liu ..................... | A45C 13/262 |
| 9,408,449 B1 | * | 8/2016 | Tsai .................... | A45C 13/26 |
| 9,872,547 B2 | * | 1/2018 | Naiva .................. | B25H 3/02 |
| 9,894,971 B2 | * | 2/2018 | Scicluna ............. | A45C 13/262 |
| 2002/0095745 A1 | * | 7/2002 | Wang .................. | A45C 13/262 16/405 |
| 2005/0067245 A1 | * | 3/2005 | Tsai .................... | A45C 13/262 16/113.1 |
| 2005/0102795 A1 | | 5/2005 | Chou | |
| 2006/0213029 A1 | * | 9/2006 | Lu ...................... | A45C 13/262 16/113.1 |
| 2006/0225981 A1 | * | 10/2006 | Lin ..................... | A45C 13/262 16/113.1 |
| 2010/0205779 A1 | * | 8/2010 | Wang .................. | A45C 13/262 190/115 |
| 2013/0068579 A1 | | 3/2013 | Mathieu et al. | |
| 2014/0137370 A1 | * | 5/2014 | Lo ...................... | A45C 13/262 16/113.1 |
| 2017/0112250 A1 | | 4/2017 | Hartmann et al. | |

FOREIGN PATENT DOCUMENTS

| | | |
|---|---|---|
| CN | 209788806 U | 12/2019 |
| WO | 2017/192694 A1 | 11/2017 |

OTHER PUBLICATIONS

Written Opinion for PCT/EP2020/077372 dated Nov. 6, 2020 [PCT/ISA/237].

Office Action dated Jun. 13, 2022 issued by the Chinese Patent Office in Chinese Application No. 202080003860.4.

* cited by examiner

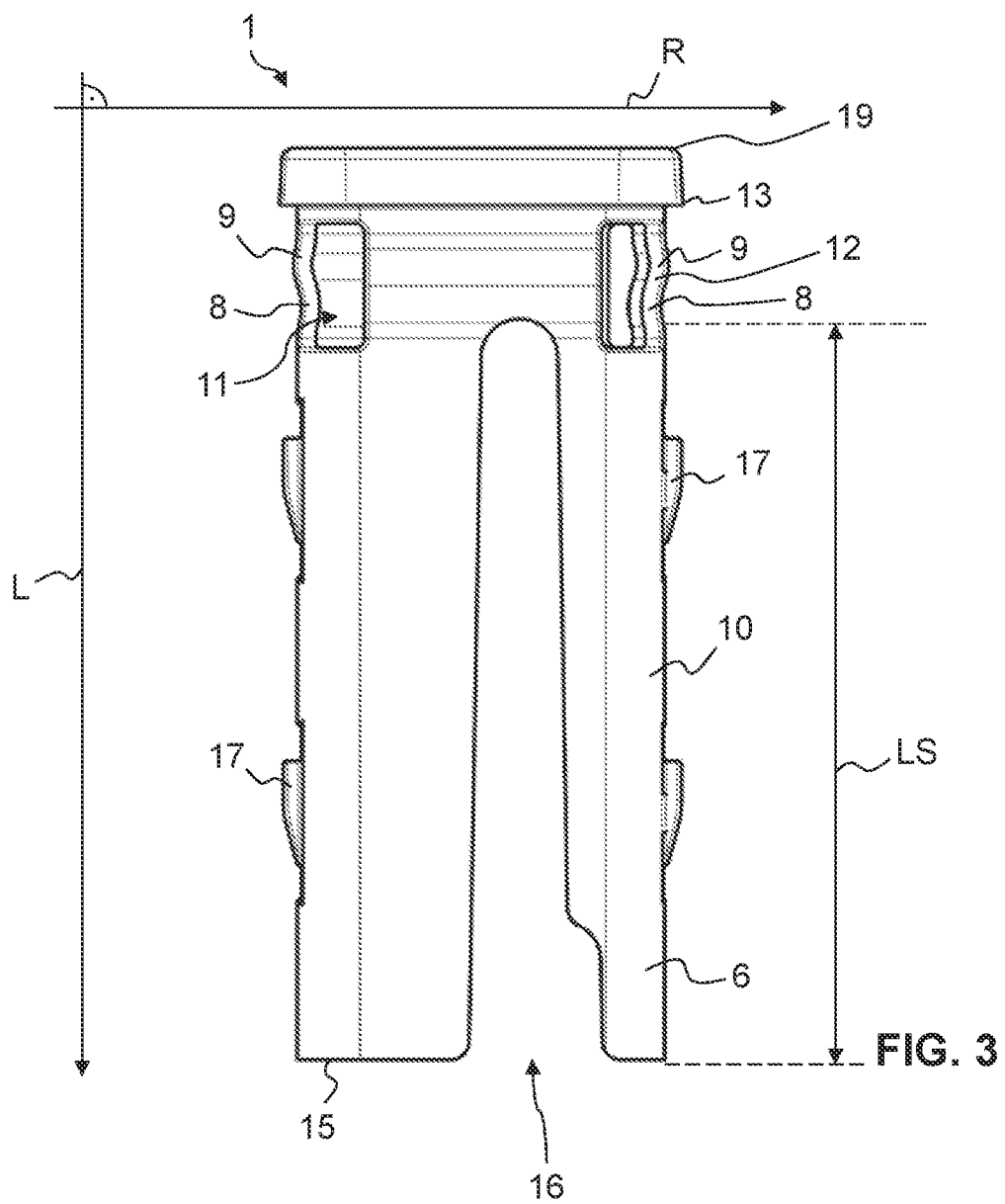
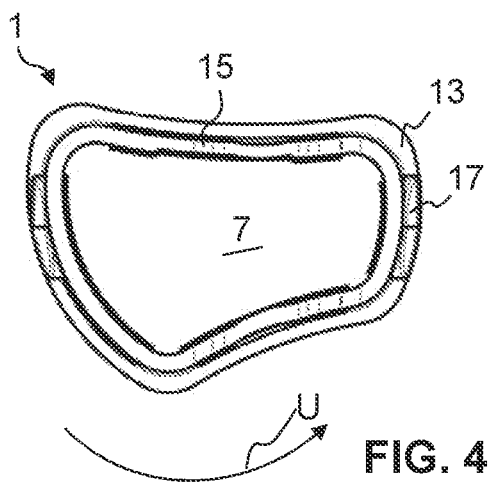
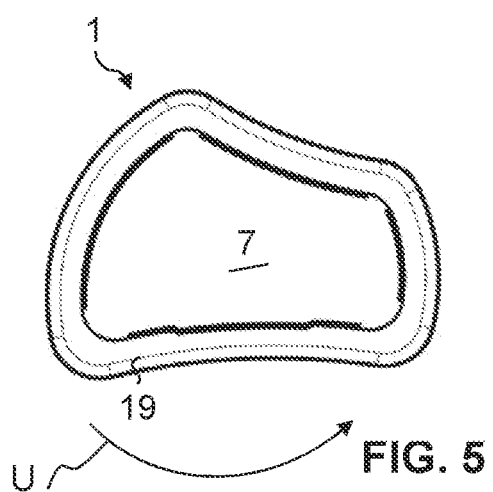
FIG. 3
FIG. 4
FIG. 5

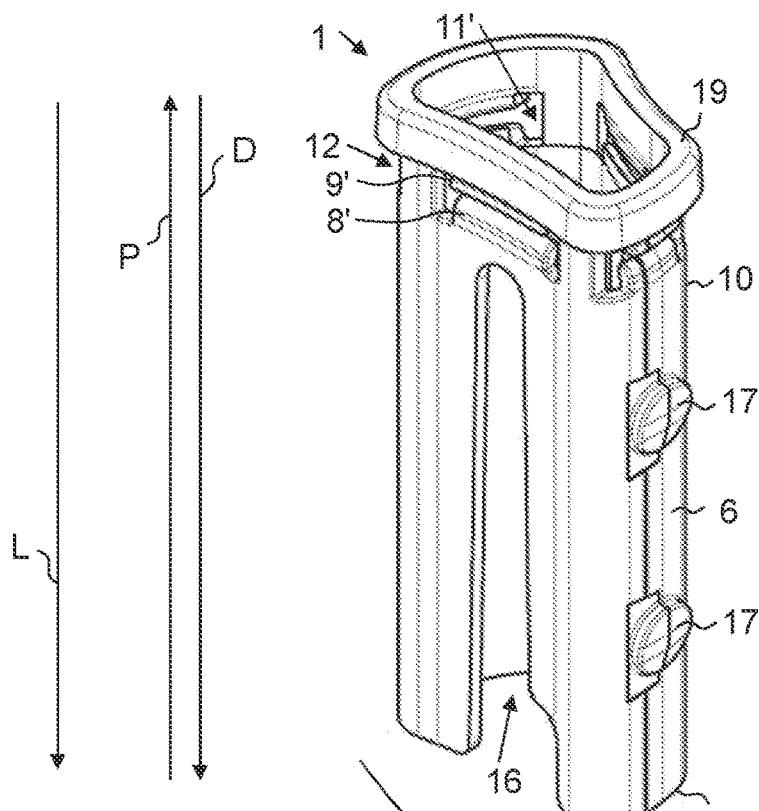
FIG. 16
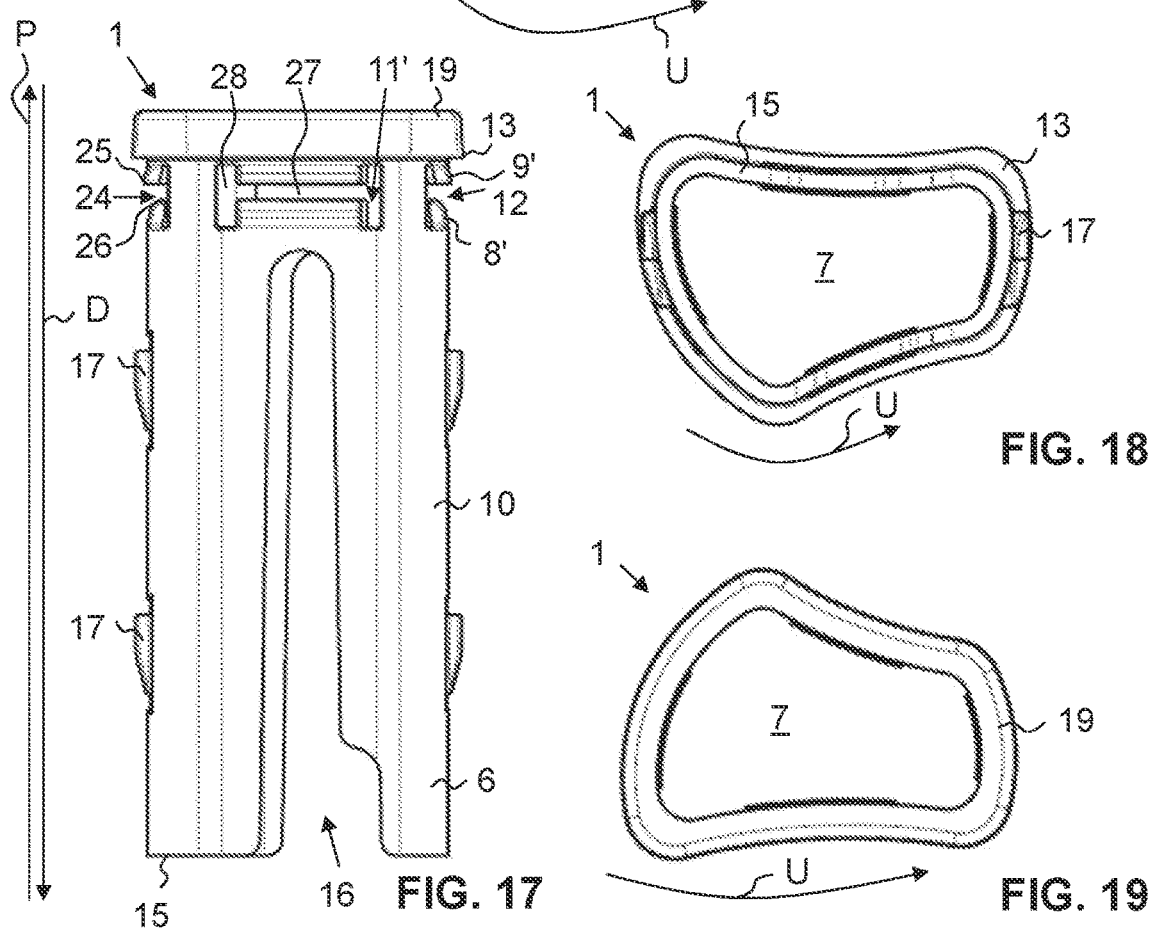
FIG. 17
FIG. 18
FIG. 19

STABILIZING DEVICE FOR A TELESCOPIC HANDLE OF A PIECE OF LUGGAGE

CROSS REFERENCE TO RELATED APPLICATIONS

This application is a National Stage of International Application No. PCT/EP2020/077372 filed Sep. 30, 2020, claiming priority based on European Patent Application No. 20 159 747.3 filed Feb. 27, 2020.

TECHNICAL FIELD

The present invention relates to a stabilizing device for a telescopic handle according to claim 1, to a telescopic handle for a piece of luggage comprising such a stabilizing device according to claim 15, a piece of luggage comprising such a stabilizing device and/or such a handle according to claim 18, as well as to a method of producing such a stabilizing device according to claim 19, respectively.

PRIOR ART

Pieces of luggage such as suitcases often comprise a telescopic handle. Typical telescopic handles comprise an outer handle element and an inner handle element that is insertable into the outer handle element and which is movable relative to the outer handle element so as to adjust a height of the telescopic handle. Unfortunately, clearances between the inner handle element and the outer handle element render the arrangement of the inner handle element within the outer handle element unstable and often result in an undesired wobbling of the handle elements with respect to one another.

SUMMARY OF THE INVENTION

It is an object of the present invention to provide a stabilizing device for a telescopic handle that overcomes the disadvantages of the prior art. In particular, it is an object to provide a stabilizing device that increases a stability of the telescopic handle.

In particular, a stabilizing device for a telescopic handle in particular of a piece of luggage is provided. The telescopic handle comprises at least an outer handle element and an inner handle element that is insertable into the outer handle element. The stabilizing device comprises a device body, at least an inner stabilizing element and at least an outer stabilizing element. The device body extends along a longitudinal direction of the stabilizing device and comprising an opening. The stabilizing device is configured such, that the inner handle element is at least partially insertable into the opening of the device body. The stabilizing device is further configured to be at least partially insertable into the outer handle element. The inner stabilizing element and the outer stabilizing element are configured such that, in an installed position, wherein the inner handle element is at least partially inserted into the stabilizing device and the stabilizing device is at least partially inserted into the outer handle element, the inner stabilizing element acts on the inner handle element and the outer stabilizing element acts on the outer handle element.

That is to say, a stabilizing device is provided that can be arranged in a telescopic handle, wherein the telescopic handle preferably corresponds to a telescopic handle as it is known in the art. In particular, the stabilizing device can be inserted into an outer handle element of the telescopic handle, and the inner handle element in turn can be inserted into the stabilizing device. In other words, the stabilizing device can be arranged between the inner handle element and the outer handle element of the telescopic handle. Because the inner stabilizing element acts on the inner handle element and the outer stabilizing element acts on the outer handle element in the installed position, the stabilizing device stabilizes the inner handle element and the outer handle element relative to one another. In particular, in the installed position the inner stabilizing element acts on the inner handle element and the outer stabilizing element acts on the outer handle element such, that the inner handle element and the outer handle element are stabilized relative to one another. Any wobbling such as a rotation or twisting of the handle elements relative to one another is thereby reduced or even prevented.

To this end it is preferred that the outer handle element comprises an inner surface and that the inner handle element comprises an outer surface, and wherein the inner stabilizing element and the outer stabilizing element are configured such that, in the installed position, the inner stabilizing element acts on the outer surface of the inner handle element and the outer stabilizing element acts on the inner surface of the outer handle element. Particularly preferably, the inner surface of the outer handle element and the outer surface of the inner handle element are even surfaces at least in the region of their interaction with the inner and outer stabilizing element. An even surface is understood here as a surface without any projections or recesses or holes or the like. That is, the inner and outer stabilizing element, when in the installed position, preferably act against even surfaces of the handle elements. Again in other words, no form fit is generated between the stabilizing elements and the handle elements, Instead, a stabilization of the stabilizing device is achieved via a frictional connection established between the stabilizing elements and the handle elements only.

The inner stabilizing element is preferably configured to enter a friction fit and/or a force fit with the inner handle element. Additionally or alternatively, the outer stabilizing element is preferably configured to enter a friction fit and/or a force fit with the outer handle element. A friction fit, which can also be referred to as interference fit or press fit, is understood here as a form of fastening between the inner handle element, in particular its outer surface, and the inner stabilizing element and between the outer handle element, in particular its inner surface, and the outer stabilizing element, respectively. Likewise, a force fit is understood here as a form of fastening between the inner handle element, in particular its outer surface, and the inner stabilizing element and between the outer handle element, in particular its inner surface, and the outer stabilizing element, respectively. In the force fit an adhesive friction is generated between the pre-stressed inner stabilizing element (see further below) and the inner handle element, in particular its outer surface, which prevents a movement of the inner stabilizing element and the inner handle element with respect to one another in a radial direction as long as no force is applied which exceeds the pre-stress force of the inner stabilizing element. The same applies to the force fit established between the outer stabilizing element and the outer handle element, wherein an adhesive friction is generated between the pre-stressed outer stabilizing element (see further below) and the outer handle element, in particular its inner surface, which prevents a movement of the outer stabilizing element and the outer handle element with respect to one another in a radial direction as long as no force is applied which exceeds the pre-stress force of the outer stabilizing element.

Thus, the action of the inner stabilizing element on the inner handle element mentioned above can be understood as a friction fit and/or a force fit that is generated between the inner stabilizing element and the outer surface of the inner handle element. Likewise, the action of the outer stabilizing element on the outer handle element mentioned above can be understood as a friction fit and/or a force fit that is generated between the outer stabilizing element and the inner surface of the outer handle element. Thereby, a pre-tension of the inner and outer stabilizing elements against the inner and outer handle elements is created. In other words, the inner stabilizing element is configured such that, in the installed position, it is pre-tensioned or pre-stressed against the inner handle element, in particular against the outer surface of the inner handle element. Additionally or alternatively, the outer stabilizing element is configured such that, in the installed position, it is pre-tensioned or pre-stressed against the outer handle element, in particular against the inner surface of the outer handle element. The pre-tensioned or pre-stressed inner stabilizing element exerts a tension force onto the inner handle element, in particular onto the outer surface of the inner handle element. The pre-tensioned or pre-stressed outer stabilizing element exerts a tension force onto the outer handle element, in particular onto the inner surface of the outer handle element.

The stabilizing device is preferably configured such that, in the installed position, the inner handle element is movable with respect to the stabilizing device. That is to say, when the stabilizing device is at least partially inserted into the outer handle element and the inner handle element is at least partially inserted into the stabilizing element, the inner handle element is still movable with respect to the stabilizing device and consequently also with respect to the outer handle element. In this case an expansion and retraction of the telescopic handle is ensured. Additionally or alternatively, the outer handle element is preferably immovable with respect to the stabilizing device. In this case, in the installed position, the stabilizing device is fixedly arranged within the outer handle element.

The expression regarding the stabilizing device being inserted at least partially into the outer handle element means, that the stabilizing device is inserted into the outer handle element at least to an extend that the outer stabilizing element can act on the outer handle element. Analogously, the expression regarding the inner handle element being at least partially inserted the stabilizing device means, that the inner handle element is inserted into the stabilizing device at least to an extend that the inner stabilizing element can act on the inner handle element. It is of course likewise conceivable, that the stabilizing device is essentially entirely or entirely inserted into the outer handle element and/or that the inner handle element extends essentially entirely or entirely through the stabilizing element.

The inner stabilizing element preferably extends with respect to a radial direction running perpendicularly to the longitudinal direction radially inwards.

The inner stabilizing element can be configured such that in an uninstalled position the inner stabilizing element extends radially inwards along the radial direction by a first length and in the installed position the inner stabilizing element extends radially inwards along the radial direction by a second length being smaller than the first length. In other words, it is preferred that the inner stabilizing element is deformable. It is furthermore conceivable that the inner stabilizing element is deformable, but not compressible.

Additionally or alternatively the outer stabilizing element preferably extends with respect to the radial direction radially outwards.

The outer stabilizing element can be configured such that in the uninstalled position the outer stabilizing element extends radially outwards along the radial direction by a first length and in the installed position the outer stabilizing element extends radially outwards along the radial direction by a second length being smaller than the first length, in other words, it is preferred that the outer stabilizing element is deformable. It is furthermore conceivable that the outer stabilizing element is deformable, but not compressible.

In the uninstalled position, the first length associated with the inner stabilizing element can be equal to or different from the first length associated with the outer stabilizing element. Additionally or alternatively, in the installed position, the second length associated with the inner stabilizing element can be equal to or different from the second length associated with the outer stabilizing element. In particular, it is conceivable that the inner stabilizing element and the outer stabilizing element are deformable to the same extent or to a different extent.

The inner stabilizing element and the outer stabilizing element are preferably arranged essentially immediately adjacent to one another with respect to the longitudinal direction.

For example, the inner stabilizing element can transition into the outer stabilizing element and vice versa. However, it is also conceivable that the inner stabilizing element and the outer stabilizing element are arranged at a distance from one another.

The inner stabilizing element and/or the outer stabilizing element can be an integral part of the stabilizing device, in particular of the device body. That is, it is conceivable that the inner stabilizing element and the stabilizing device, in particular the device body, correspond to a single-piece element. It is likewise conceivable that the outer stabilizing element and the stabilizing device, in particular the device body, correspond to a single-piece element. The inner stabilizing element and the outer stabilizing element can be formed as a single-piece element. Alternatively, the inner stabilizing element and the outer stabilizing element can be provided separated from one another. In the former case it is conceivable that the inner stabilizing element, the outer stabilizing element and the device body are provided as a single-piece element.

In the latter case it is preferred that a gap is present between the inner stabilizing element and the outer stabilizing element. That is, the inner stabilizing element and the outer stabilizing element do not correspond to a single-piece element but are provided as components being separate from one another. Said separate components can however nevertheless be designed as an integral part of, for example, the device body.

The inner stabilizing element and/or the outer stabilizing element is preferably configured resiliently.

Said resiliency can be provided by means of a resilient material the inner stabilizing element and/or the outer stabilizing element are made of or which they comprise. Conceivable materials are elastically deformable materials, preferably thermoplastics. Said resilient material preferably results in the inner stabilizing element and/or the outer stabilizing element being deformable.

Additionally or alternatively sad resiliency is provided by means of the geometrical dimensions of said inner stabilizing element and/or the outer stabilizing element. For example, if the inner stabilizing element is provided with a length along the longitudinal direction in the range of 0.5 millimeter to 10 millimeter, preferably in the range of 1 millimeter to 5 millimeter and/or a thickness in the radial direction in the range of 0.25 millimeter to 4 millimeter, preferably in the range of 0.5 millimeter to 2 millimeter, then the inner stabilizing element can be deformable as outlined above. Likewise, if the outer stabilizing element is provided with a length along the longitudinal direction in the range of 0.5 millimeter to 10 millimeter, preferably in the range of 1 millimeter to 5 millimeter and/or a thickness in the radial direction in the range of 0.25 millimeter to 4 millimeter, preferably in the range of 0.5 millimeter to 2 millimeter, then the outer stabilizing element can be deformable as outlined above. That is, a resiliency can also be obtained if the geometrical dimensions of the inner stabilizing element and/or of the outer stabilizing element are comparatively small.

In the installed position, the inner stabilizing element and/or the outer stabilizing element is preferably pre-stressed. That is, it is preferred that the inner stabilizing element and/or the outer stabilizing element are capable of being pre-stressed in the installed position.

A pre-stressed inner stabilizing element preferably exhibits a pressing force and therefore an enhanced friction force onto the inner handle element. Said pressing force and therefore friction force preferably acts in the radial direction, particularly preferably radially inward.

A pre-stressed outer stabilizing element preferably exhibits a pressing force and therefore an enhanced friction force onto the outer handle element. Said pressing force and therefore friction force preferably acts in the radial direction, particularly preferably radially outward.

The inner stabilizing element and/or the outer stabilizing element preferably extend at least partially around a circumferential direction of the stabilizing device. Additionally or alternatively the inner stabilizing element and/or the outer stabilizing element preferably are arranged in sections with respect to the circumferential direction of the stabilizing device.

That is to say, it is conceivable that the inner stabilizing element and/or the outer stabilizing element extend entirely or only partly around a circumference of the stabilizing device. It is also conceivable that two or more inner stabilizing elements and/or two or more outer stabilizing elements are provided, which inner stabilizing elements and/or outer stabilizing elements are arranged in sections along the circumference of the stabilizing device.

To this end it is preferred that the stabilizing device, in particular the device body, has an elongated shape and/or an essentially tubular shape. The opening of the device body preferably corresponds to a through-opening that extends along an entire length of the stabilizing device with respect to the longitudinal direction.

The device body can comprise a sheathing wall, and wherein the inner stabilizing element is formed as an inwardly protruding projection of the sheathing wall and/or wherein the outer stabilizing element is formed as an outwardly protruding projection of the sheathing wall.

It is however likewise conceivable that the inner stabilizing element and/or the outer stabilizing element are configured separately from the sheathing wall but are arranged on said sheathing wall as protruding projections.

It is particularly preferred that the device body comprises a sheathing wall that defines a curvature along the longitudinal direction, wherein the curvature comprises at least a first curved region extending along the radial direction radially outward and at least a second curved region extending along the radial direction radially inward, and wherein the outer stabilizing element is provided by the first curved region and the inner stabilizing element is provided by the second curved region. In other words, a central axis of the sheathing wall that runs centrally through the sheathing wall and parallel to the longitudinal axis curves in a first curved region radially outward as well as in a second curved region radially inward. That is, it is preferred that the stabilizing elements are provided by the curvature formed in the sheathing wall. The curved regions, and thus the stabilizing elements, can therefore be seen as deflections of the sheathing wall.

It should be noted that the sheathing wall can be configured continuously, i.e. without any interruptions. In this case, the first curved region and the second curved region are provided by a continuously formed curvature of the sheathing wall. However, it is likewise conceivable that the sheathing wall is configured interrupted, wherein a gap or the like is formed between the inner stabilizing element and the outer stabilizing element, and wherein the first curved region and the second curved region are provided by an interrupted curvature, with a gap or the like that separates them from one another.

It is particularly preferred that the outer stabilizing element is arranged before the inner stabilizing element when seen from a proximal end of the stabilizing device towards a distal end of the stabilizing device. The distal end is understood here as said end of the stabilizing device that faces a floor when the stabilizing device is in the installed position, and the proximal end is understood here as said end of the stabilizing device that faces away from the floor when the stabilizing device is in the installed position. In other words, the proximal end can be seen as the upper end and the distal end can be seen as the lower end of the stabilizing device when seen in the installed position.

In the case of a continuous sheathing wall it is furthermore preferred that the sheathing wall extends, when seen from the proximal end of the stabilizing device towards the distal end of the stabilizing device, initially in a linear manner but then curves in the first curved region radially outward, thereafter curves in the second curved region radially inward, and finally returns into its original linear manner.

In the case of the interrupted sheathing wall it is preferred that the sheathing wall extends, when seen from the proximal end of the stabilizing device towards the distal end of the stabilizing device, initially in a linear manner but then curves in the first curved region radially outward and terminates in a free end. Moreover, in this embodiment the sheathing wall extends, when seen from the distal end of the stabilizing device towards the proximal end of the stabilizing device, initially in a linear manner but then curves in the second curved region radially inward and terminates in a free end. In other words, when seen from the proximal end of the stabilizing device towards the distal end of the stabilizing device, the second curved region curves from a radially inwardly offset position radially outward and into a linearly extending region of the sheathing wall.

In this context it should be noted that the sheathing wall extends in a linear manner at least in the region of the stabilizing elements. Consequently, the sheathing wall can extend in a linear manner everywhere except in the region of the stabilizing elements. Alternatively, it is likewise conceivable that the sheathing wall comprises further regions where it does not extend in a linear manner.

The free end of the first curved region preferably corresponds to an area of the first curved region that is most distant from the central axis of the sheathing wall when seen along the radial direction. Likewise, the free end of the second curved region preferably corresponds to an area of the second curved region that is most distant from the central axis of the sheathing wall when seen along the radial direction.

In any case, the first curved region preferably extends outwards from the central axis at a first angle of curvature of between 10° and 90°, more preferably between 20° and 50°. Additionally or alternatively, the second curved region preferably extends inwards from the central axis at a second angle of curvature of between 10° and 90°, more preferably between 20° and 50°.

It is furthermore preferred that the angles of curvature are smaller in the installed state of the stabilizing device as compared to the uninstalled state of the stabilizing device. This change in the angles of curvature can be a result of deformable stabilizing elements, see explanations provided above.

The first angle of curvature is defined as the angle being formed between the central axis and a fictitious line extending through a first point on the central axis and a second point on an outer surface of the sheathing wall, the first point on the central axis being located where a lateral distance between the central axis and the outer surface of the sheathing wall in the first curved region is minimal and the second point being located on the outer surface where a lateral distance between the central axis and the outer surface of the sheathing wall in the first curved region is maximal. Likewise, the second angle of curvature is defined here as the angle being formed between the central axis and a further fictitious line extending through a further first point on the central axis and a further second point on an inner surface of the sheathing wall, the further first point on the central axis being located where a lateral distance between the central axis and the inner surface of the sheathing wall in the second curved region is minimal and the further second point being located on the inner surface where a lateral distance between the central axis and the inner surface of the sheathing wall in the second curved region is maximal.

The stabilizing device can comprise in the region of the inner stabilizing element and/or of the outer stabilizing element one or more recesses. Said one or more recesses are preferably provided as through-openings in the sheathing wall. Said recesses serve the purpose of reducing a pre-stress and friction force of the stabilizing device onto the inner handle element, whereby a slidability of the inner handle element within the stabilizing device is improved. In other words, a contact and consequently a friction force between the stabilizing device and the inner handle element is prevented in the regions of the one or more recesses. Again in other words, the friction force is reduced due to the presence of small touching or contacting surfaces configured on the stabilizing device.

The inner stabilizing element and/or the outer stabilizing element are preferably arranged in a proximal region of the stabilizing device, i.e. in a region of the proximal end of the stabilizing device. In other words, the inner stabilizing element and/or the outer stabilizing element are preferably arranged within a region extending from the proximal end of the stabilizing device towards the distal end of the stabilizing device by a length which is 50% or less, preferably 25% or less of the entire length of the stabilizing device. Such a proximal arrangement minimizes a play between the handle elements, whereby a tilting of the handle elements with respect to one another is further removed.

When seen in the installed position said proximal region corresponds to the region of the stabilizing device which is directed towards an outside, whereas a distal region of the stabilizing device corresponds to the region of the stabilizing device which is directed towards the suitcase body.

Additionally or alternatively an abutment element can be arranged in the proximal region of the stabilizing device, and wherein the abutment element is configured to abut against an upper surface of the outer handle element when the stabilizing device is at least partially inserted into the outer handle element. The outer stabilizing element is preferably arranged in vicinity to the abutment element. In other words, the abutment element is preferably arranged within a region extending from the proximal end of the stabilizing device towards the distal end of the stabilizing device by a length which is 10% or less, preferably 5% or less of the entire length of the stabilizing device. The outer stabilizing element is preferably arranged within a region extending from the proximal end of the stabilizing device towards the distal end of the stabilizing device by a length that is 20% or less, preferably 10% or less of the entire length of the stabilizing device, Such an arrangement minimizes any play, see above.

At least one slit can extend from a distal end of the stabilizing device at least partially through the device body along the longitudinal direction. Said slit is preferably provided in the sheathing wall of the device body and serves the purpose of reducing friction forces between the device body and the inner handle element, such that a slidability of the inner handle element is improved. The one or more slits preferably extend at least partially into the proximal region of the stabilizing device. That is, said slits preferably extend almost entirely through the whole device body.

The stabilizing device, in particular the device body, is preferably configured to be preferably releasably connected to the handle, preferably via a snap-connection and/or latching connection. To this end it is preferred that the handle, in particular the outer handle element, comprises corresponding connection elements that are configured to enter the connection with the connection elements of the stabilizing device. To this end it is particularly preferred when the stabilizing device comprises one or more protrusions that are insertable into one or more recesses provided on the outer handle element.

In a further aspect a telescopic handle for a piece of luggage is provided, wherein said telescopic handle comprises a stabilizing device as described above.

The telescopic handle preferably corresponds to a commercially available handle.

In particular, the handle preferably comprises at least one outer handle element and at least one inner handle element that is at least partially received in the outer handle element, and wherein the stabilizing device is arranged between the inner handle element and the outer handle element with respect to a radial direction running perpendicularly to the longitudinal direction of the stabilizing device.

The inner handle element preferably comprises an outer surface and the outer handle element preferably comprises an inner surface, and wherein the inner stabilizing element is pre-tensioned or pre-stressed against the outer surface of the inner handle element and/or wherein the outer stabilizing element is pre-tensioned or pre-stressed against the inner surface of the outer handle element. Thus, it is preferred that a stabilization of the handle is achieved by means of a frictional connection that is established between the stabilizing elements and the handle elements.

It should be noted that the handle can comprise two or more outer handle elements, two or more inner handle elements, and one or more stabilizing devices. In other words, a multi-stage handle can be provided as it is known in the art, wherein one stabilizing device is arranged in almost every or every stage of the handle. For example, a handle comprising five stages, i.e. four outer handle elements, four inner handle elements, and four stabilizing devices could be used. In each case one inner handle element is at least partially received in one outer handle element and, with the exception of the uppermost stage being located the furthest away from the suitcase in the expanded state, a stabilizing device is arranged in each stage between an inner handle element and an outer handle element.

A contour of the stabilizing device preferably essentially corresponds to a contour of the inner handle element and/or a contour of the outer handle element. In this case, clearances between the inner handle element and an inner surface of the stabilizing device and between the outer handle element and an outer surface of the stabilizing device can be further minimized.

In a further aspect a piece of luggage, in particular a suitcase, is provided, which piece of luggage comprises a stabilizing device as described above and/or which piece of luggage comprises a handle as described above.

In a further aspect a method of producing a stabilizing device for a telescopic handle in particular of a piece of luggage, is provided, wherein the telescopic handle comprises at least an outer handle element and an inner handle element that is insertable into the outer handle element, the stabilizing device preferably being a stabilizing device as described above.

The method comprises the steps of i) providing a device body that extends along a longitudinal direction of the stabilizing device and that comprises an opening, and ii) providing at least an inner stabilizing element and at least an outer stabilizing element. The stabilizing device is configured such, that the inner handle element is at least partially insertable into the opening of the device body. The stabilizing device is further configured to be at least partially insertable into the outer handle element. The inner stabilizing element and the outer stabilizing element are configured such that, in an installed position, wherein the inner handle element is at least partially inserted into the stabilizing device and the stabilizing device is at least partially inserted into the outer handle element, the inner stabilizing element acts on the inner handle element and the outer stabilizing element acts on the outer handle element.

The outer handle element and/or the inner handle element preferably comprises or consists of aluminium. However, every other material as it is known in the state of the art could be used, as well. The stabilizing device preferably comprises or consists of plastics; more preferably of thermoplastics. It is furthermore conceivable that the stabilizing device comprises or consists of a reinforced thermoplastic. In particular, it is conceivable to reinforce the stabilizing device with glass fibers or other fibers as they are known in the art. The suitcase can comprise or consist of thermoplastics; self-reinforced thermoplastics, aluminium, or any other material as it is known in the art.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 3 shows a perspective view of the stabilizing device according to FIG. 1;

FIG. 4 shows a bottom view of the stabilizing device according to FIG. 1;

FIG. 5 shows a top view of the stabilizing device according to FIG. 1;

FIG. 16 shows a perspective view of a stabilizing device according to a further embodiment;

FIG. 17 shows another perspective view of the stabilizing device according to FIG. 16;

FIG. 18 shows a bottom view on the stabilizing device according to FIG. 17;

FIG. 19 shows a top view on the stabilizing device according to FIG. 17;

DESCRIPTION OF PREFERRED EMBODIMENTS

Figure 1:
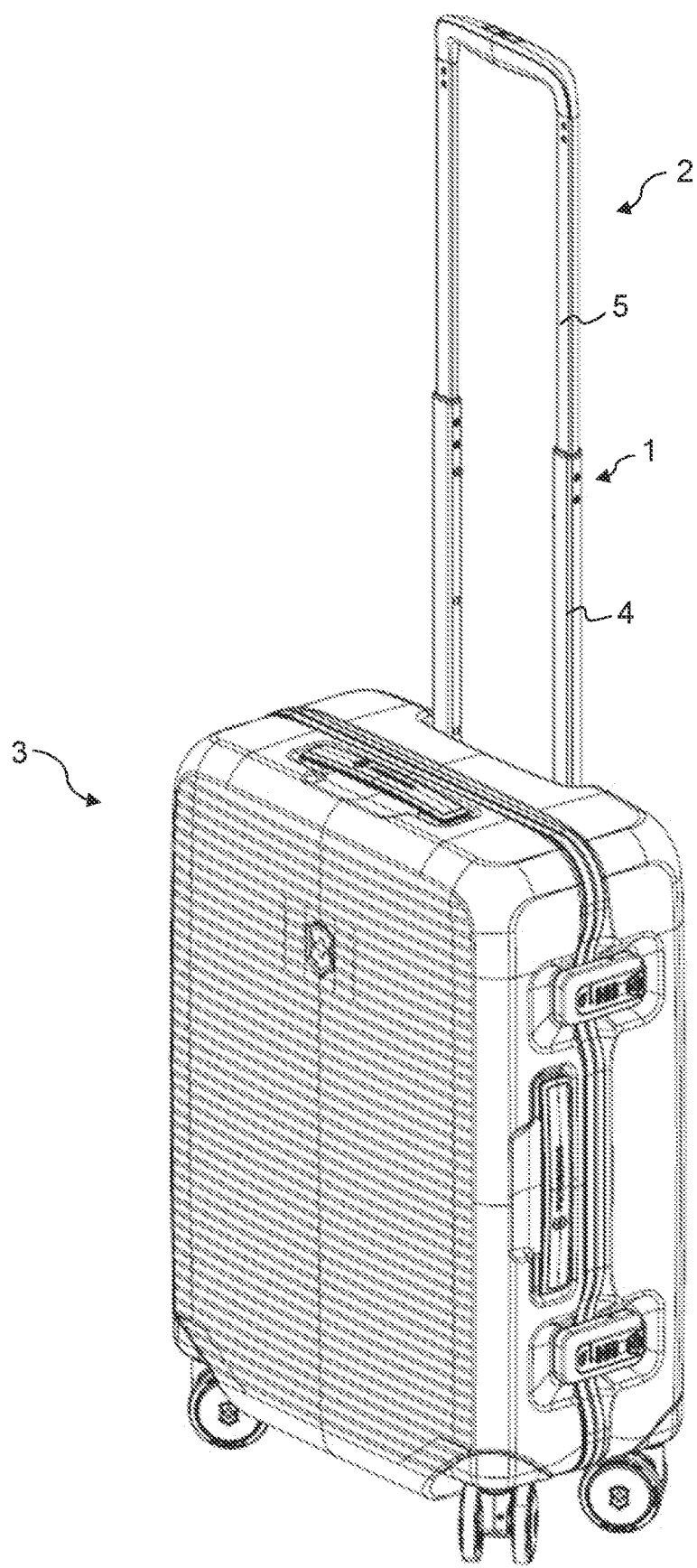
FIG. 1 shows a perspective view on a piece of luggage comprising a handle with an outer handle element and an inner handle element and a stabilizing device.

FIG. 1 depicts a piece of luggage 3 in the form of a suitcase which comprises a telescopic handle 2 with an outer handle element 4 and an inner handle element 5 that is partially received within the outer handle element 4. The inner handle element 5 is slideable relative to the outer handle element 4, whereby a height of the handle 2 is adjustable. In order to prevent or at least reduce a wobbling of the inner handle element 5 relative to the outer handle element 4 and vice versa, for example a tilting or rotation of these handle elements 4, 5 with respect to one another, a stabilizing device 1 is arranged in the handle 2. Said stabilizing device 1 comprises, inter glia, an inner stabilizing element 8, 8' and an outer stabilizing element 9, 9'. With regard to FIGS. 2 to 23 different aspects of said stabilizing device are discussed in greater detail. To this end it should be noted that the stabilizing device 1 depicted in FIGS. 2 to 15 and the stabilizing device 1 depicted in FIGS. 16 to 23 differ from one another essentially in the design of their inner stabilizing elements 8, 8' and their outer stabilizing elements 9, 9'. Hence, any other aspects that are explained herein with reference to the stabilizing device 1 according to FIGS. 1 to 15 likewise applies to the stabilizing device according to FIGS. 16 to 23 and vice versa.

Figure 2:
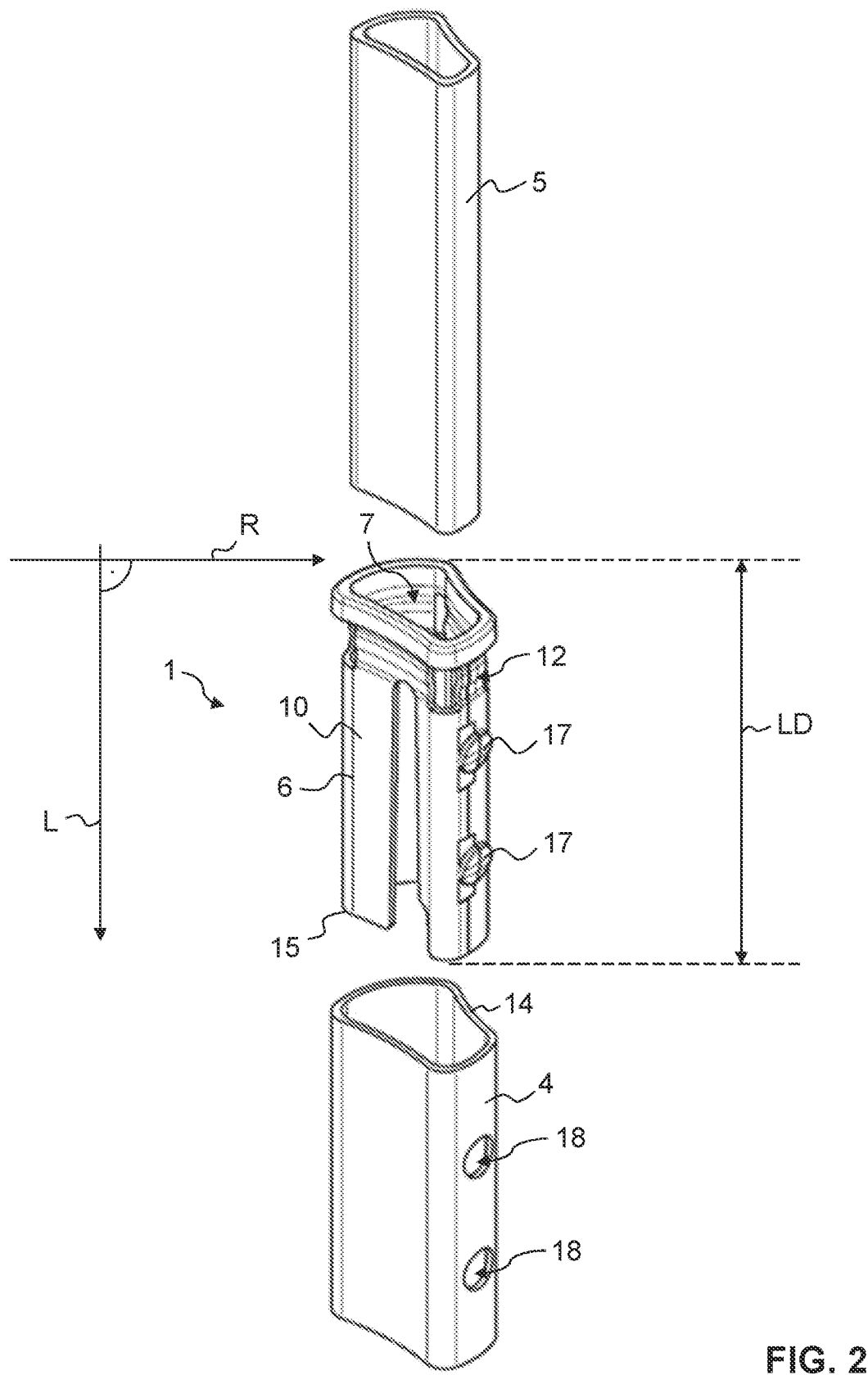
FIG. 2 shows an exploded partial view of the outer handle element, the inner handle element and the stabilizing device according to FIG. 1.

As follows from FIG. 2, the inner handle element 5 is at least partially insertable into the stabilizing device 1 and the stabilizing device 1 in turn is at least partially insertable into the outer handle element 4. Hence, in an installed position, wherein the inner handle element 5 is at least partially inserted into the stabilizing device 1 and the stabilizing device 1 is at least partially inserted into the outer handle element 4, the stabilizing device 1 is arranged between the inner handle element 5 and the outer handle element 4 with respect to a radial direction R running perpendicularly to a longitudinal direction L of the stabilizing device 1. To this end the stabilizing device 1 comprises a device body 6 that extends along the longitudinal direction L of the stabilizing device and which comprises an opening 7 in the form of a through-opening which extends along an entire length LD of the stabilizing device 1. As is readily evident from FIG. 1, a contour of the stabilizing device 1 essentially corresponds to a contour of the inner handle element 5 as well as to a contour of the outer handle element 4. That is, the stabilizing device 1, the inner handle element 5 and the outer handle element 4 are in each case of an elongate shape, wherein one side of the stabilizing device 1, one side of the inner handle element 5 and one side of the outer handle element 4 is configured enlarged with respect to an opposing side of the stabilizing device 1, of the inner handle element 5 and of the outer handle element 4, respectively. That is to say, the inner handle element 5, the outer handle element 4 and the stabilizing device 1 are in each case of an asymmetric shape with respect to an imaginary mirror plane running through these components 1, 4, 5.

The geometrical dimensions of the inner handle element 5 and of the stabilizing device 1 are such that, in the installed position, the inner handle element 5 is movable, in particular slideable with respect to the stabilizing device 1. In this way an expansion and retraction of the telescopic handle 2 is enabled. However, the outer handle element 4 and the stabilizing device 1 are configured such, that the outer handle element 4 is immovable with respect to the stabilizing device 1 in the installed position. In other words, the stabilizing device 1 is arranged fixedly within the outer handle element 4. Such a fixation is achieved by a snap-connection and/or latching connection, wherein projections 17 provided on the stabilizing device 1 enter a releasable connection with corresponding slots 18 provided on the outer handle element 4. Moreover, an abutment element 13 is arranged in a proximal region 12 of the stabilizing device 1, and wherein the abutment element 13 is configured to abut against an upper surface 14 of the outer handle element 4 when the stabilizing device 1 is at least partially inserted into the outer handle element 4. As follows from FIGS. 3, 4, 12 and 13, for example, said abutment element 13 corresponds to a rim which forms the proximal end 19 of the stabilizing device 1 and which extends around an entire circumference of the stabilizing device 1. Furthermore, said rim 13 laterally protrudes over the device body 6 with respect to the radial direction R running perpendicularly to the extension direction E. Hence, if the stabilizing device 1 is inserted into the hollow outer handle element 4, said protruding rim 13 comes to lie on the upper surface 14 of the outer handle element 4. As follows from FIGS. 2 to 3, 6 to 9 and 11, a slit 16 extends from a distal end 15 of the stabilizing device 1 at least partially through the device body 6 along the longitudinal direction L. In particular, the slit 16 extends at least partially into the proximal region 12 of the stabilizing device 1 and thus through a major part of the device body 6. Said slit 16 serves the purpose of facilitating a compression of the stabilizing device 1, whereby an insertion of the stabilizing device 1 into the outer handle element 4 is facilitated. In fact, a diameter of the stabilizing device in an uncompressed state preferably corresponds to or is even larger than an internal diameter of the outer handle element 4, Hence, in order to insert the stabilizing device 1 into the outer handle element 4 the stabilizing device 1 is preferably compressed. After insertion of the stabilizing device 1 and in the absence of a compression force exerted onto the stabilizing device by a user, the stabilizing device 1 adopts its uncompressed state, whereby it is fixedly installed within the outer handle element 4.

Figure 13:
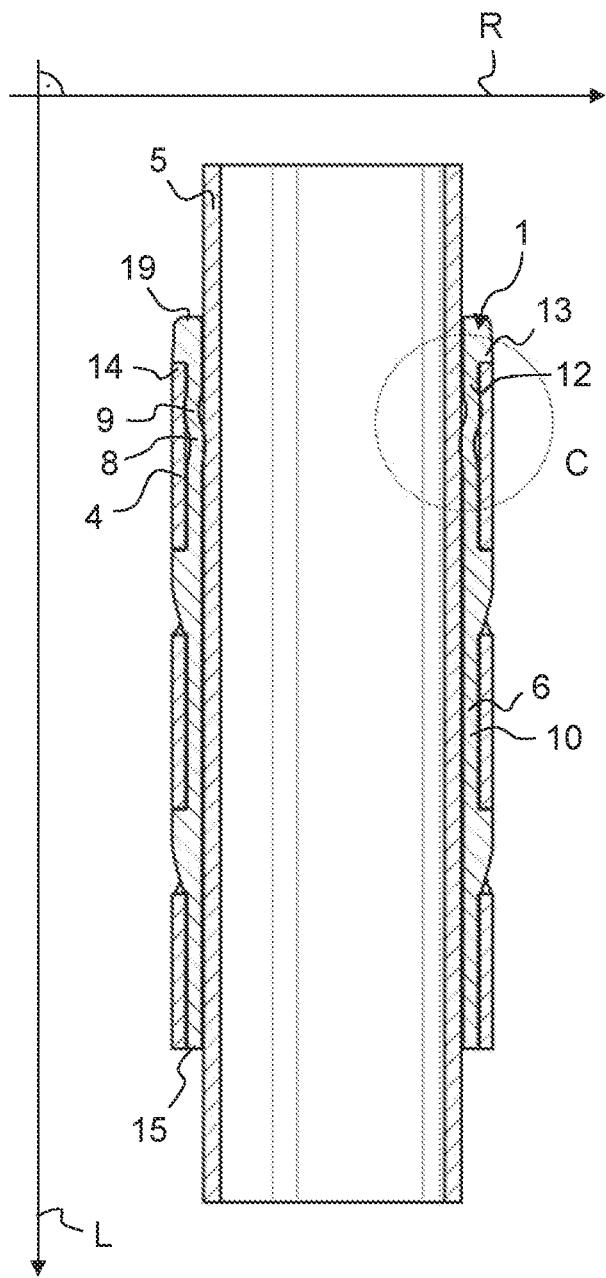
FIG. 13 shows a sectional view of the inner handle element, the outer handle element and the stabilizing device according to FIG. 12.
Figure 14:
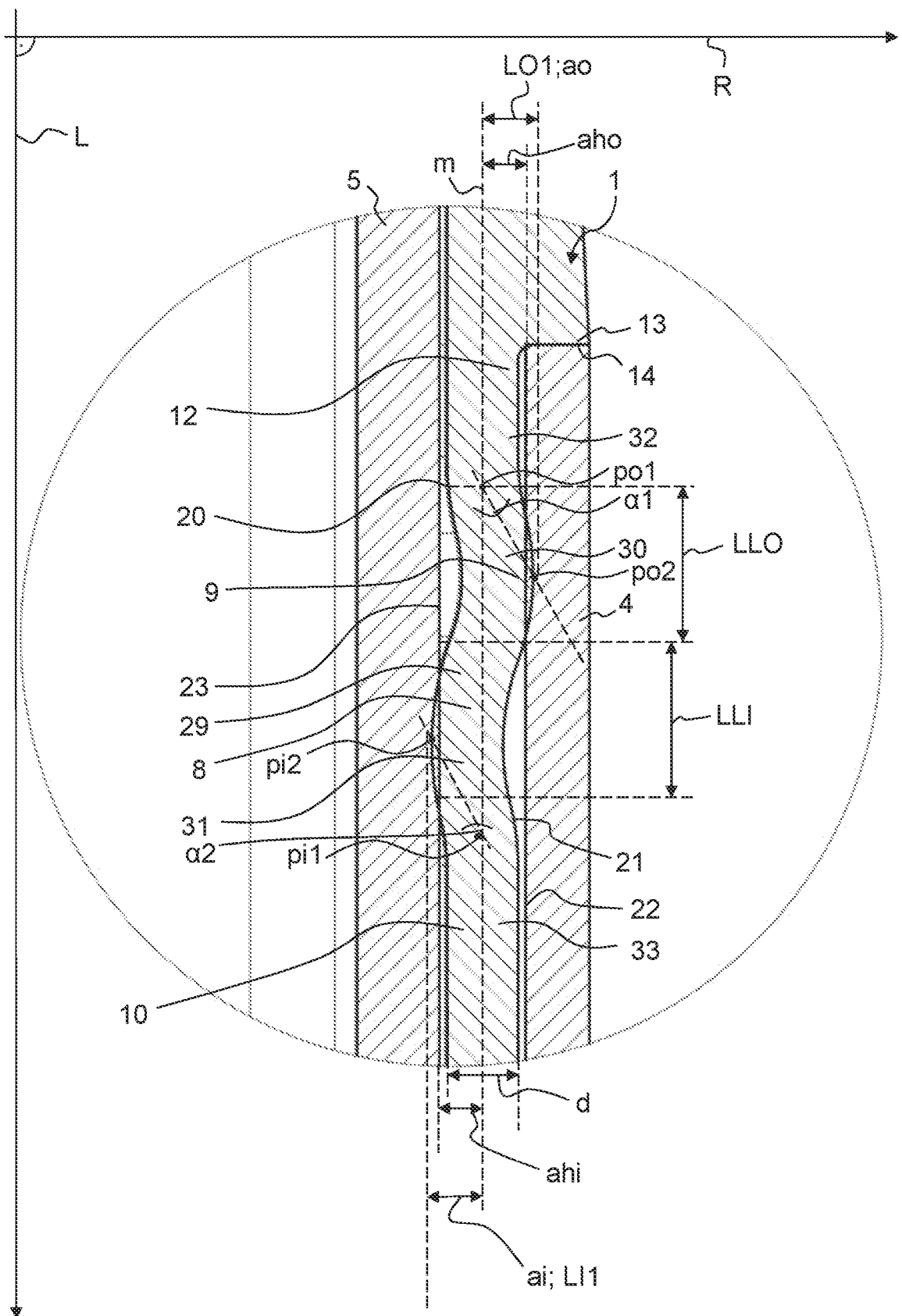
FIG. 14 shows an enlarged view of the area C according to FIG. 13, wherein the stabilizing device is depicted in a relaxed state for illustrative purposes.
Figure 15:
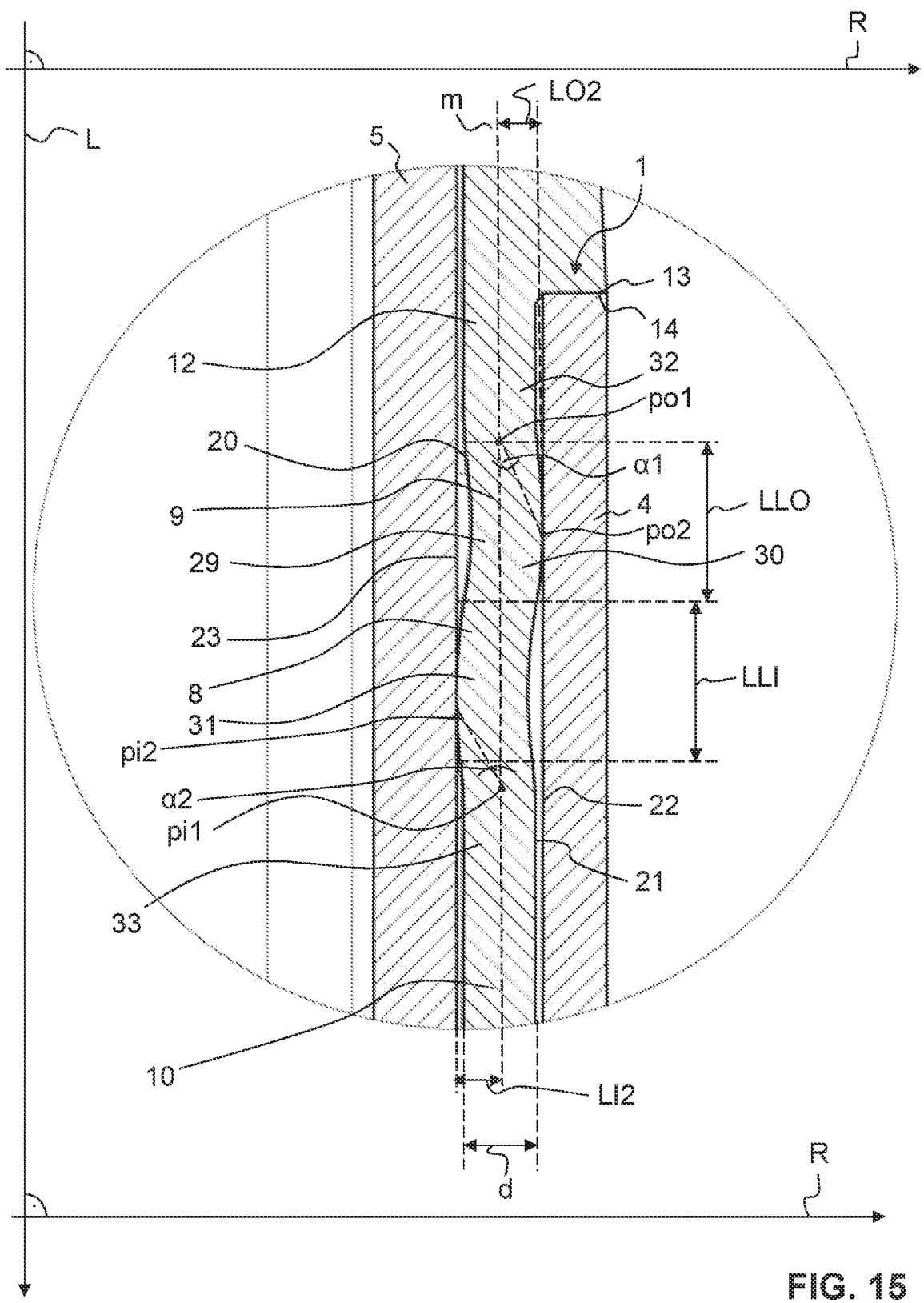
FIG. 15 shows an enlarged view of the area C according to FIG. 13, wherein the stabilizing device is depicted in a pre-stressed state.
Figure 20:
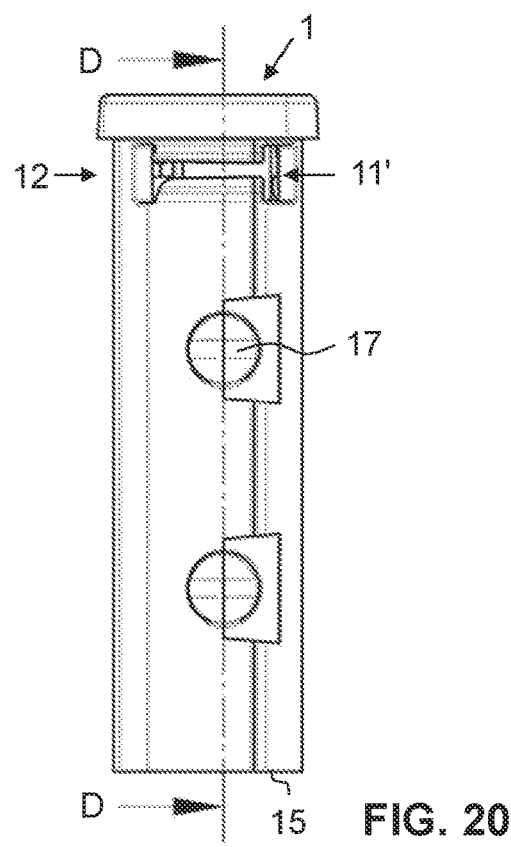
FIG. 20 shows another perspective view of the stabilizing device according to FIG. 16.

As best seen in FIGS. 13 to 15, the stabilizing device 1 further comprises at least one inner stabilizing element 8 and at least one outer stabilizing element 9. The inner stabilizing element 8 and the outer stabilizing element 9 are configured such that, in an installed position, the inner stabilizing element 8 acts on the inner handle element 5 and the outer stabilizing element 9 acts on the outer handle element 4 such, that the inner handle element 5 and the outer handle element 4 are stabilized relative to one another. In this way a wobbling of the handle elements 4, 5 within one another such as a tilting or rotation with respect to one another is prevented or at least reduced. In the installed position the inner stabilizing element 8 is configured to enter a friction fit with the inner handle element 5 and the outer stabilizing element 9 is configured to enter a friction fit with the outer handle element 4, respectively. In fact, and as follows from FIGS. 13 and 15, in the installed position the inner stabilizing element 8 and the inner handle element 5 are contacting one another and the outer stabilizing element 9 and the outer handle element 4 are contacting one another. To this end a friction force is generated at the respective contacting regions, which friction force stabilizes the arrangement of the inner handle element 5 within the outer handle element 4. However, in order to still allow a displacement of the inner handle element 5 with respect to the outer handle element 4 for retracting or expanding the handle 2, a friction force generated in other regions of the stabilizing device 1 is minimized. In fact, and as best seen in FIG. 15, apart from the contact between the inner stabilizing element 8 and the outer stabilizing element 9 with the handle elements 4, 5, no further contact and therefore no further friction force is established between other parts of the stabilizing device 1 and the inner handle element 5 and the outer handle element 4. To this end the inner stabilizing element 8 and the outer stabilizing element 9 are both arranged in the proximal region 12 of the stabilizing device 1. Moreover, the inner stabilizing element 8 and the outer stabilizing element 9 extend only partly around a circumferential direction U of the stabilizing device 1 as well as in sections. In addition, the stabilizing device 1 comprises in the region of the inner stabilizing element 8 and the outer stabilizing element 9 recesses 11, Hence, the sections of the inner stabilizing element 8 and of the outer stabilizing element 9 are separated from one another by these recesses 11. Because of these recesses 11 a frictional force generated between the stabilizing device 1 and the inner handle element 5 and the outer handle element 4 is further reduced.

Figure 6:
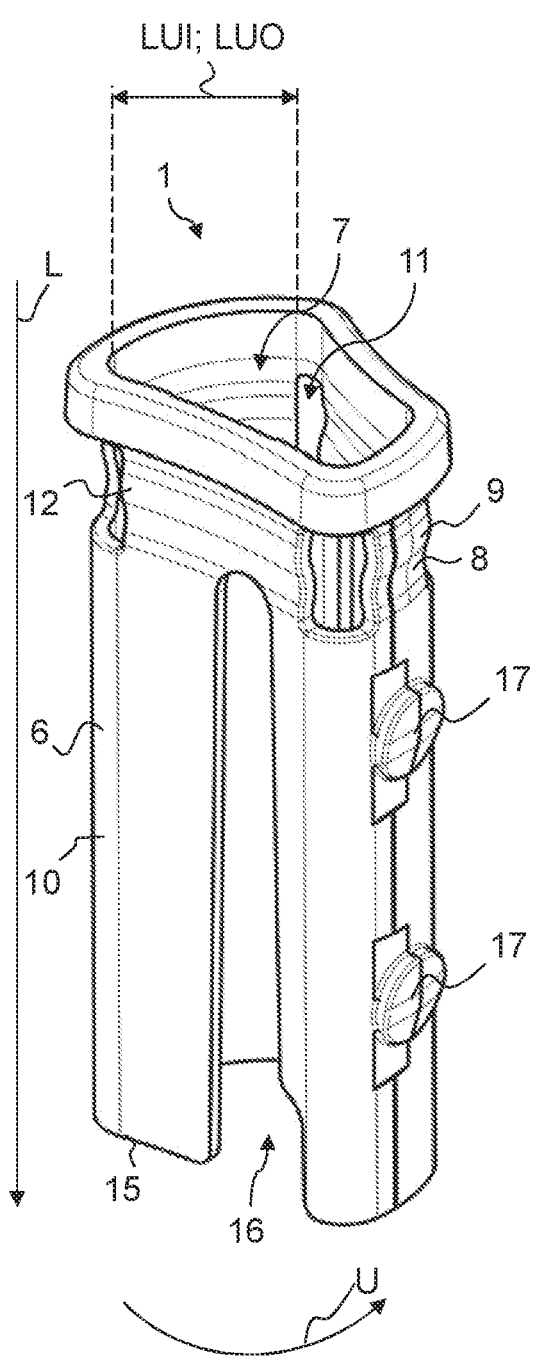
FIG. 6 shows another perspective view of the stabilizing device according to FIG. 1.
Figure 7:
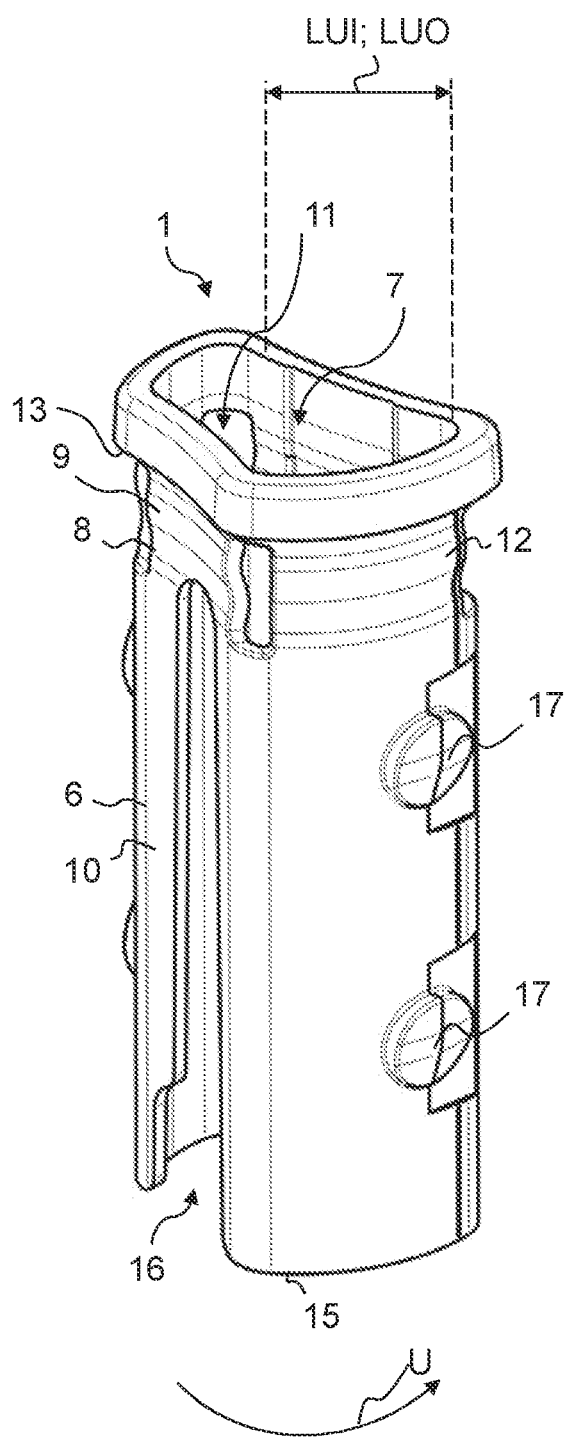
FIG. 7 shows another perspective view of the stabilizing device according to FIG. 1.
Figure 8:
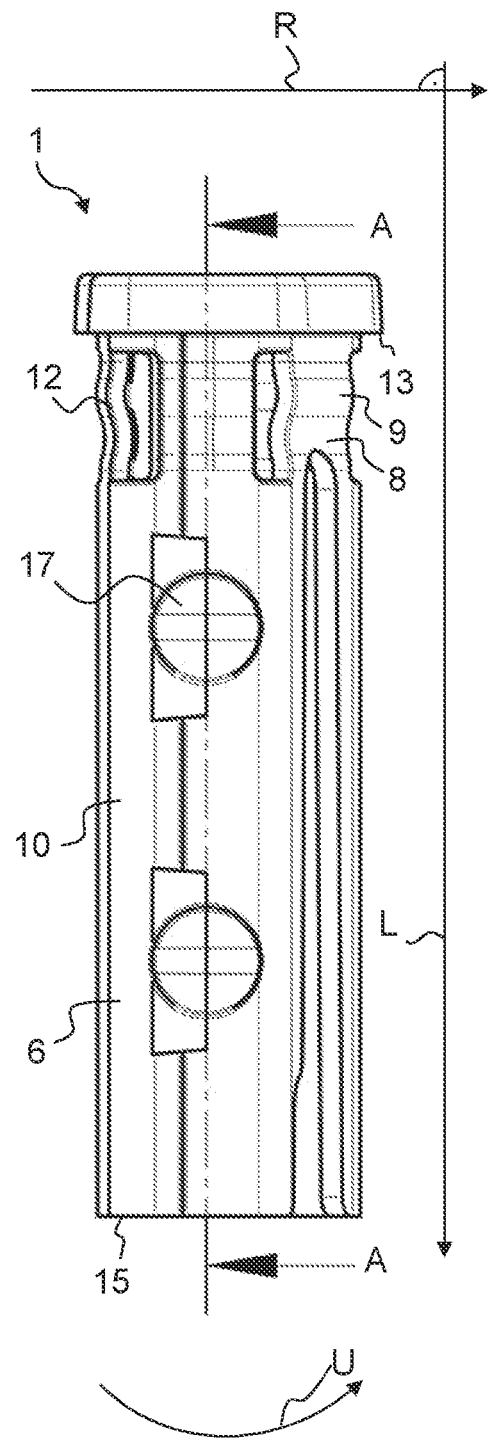
FIG. 8 shows another perspective view of the stabilizing device according to FIG. 1.
Figure 9:
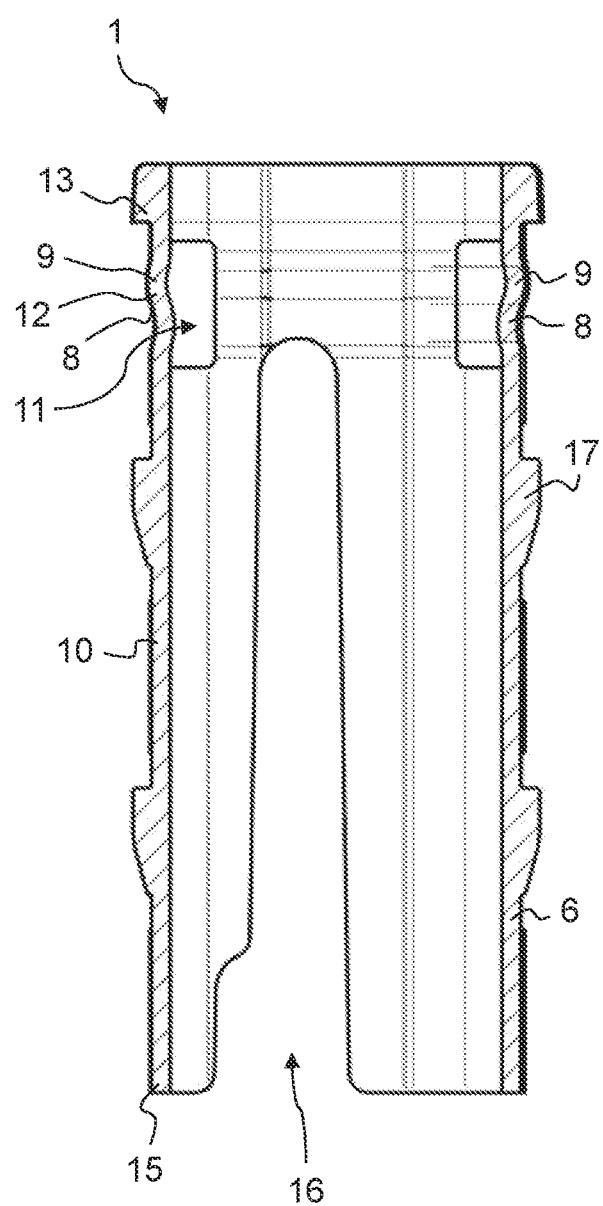
FIG. 9 shows a sectional view of the stabilizing device according to FIG. 8 along the line A-A.
Figure 10:
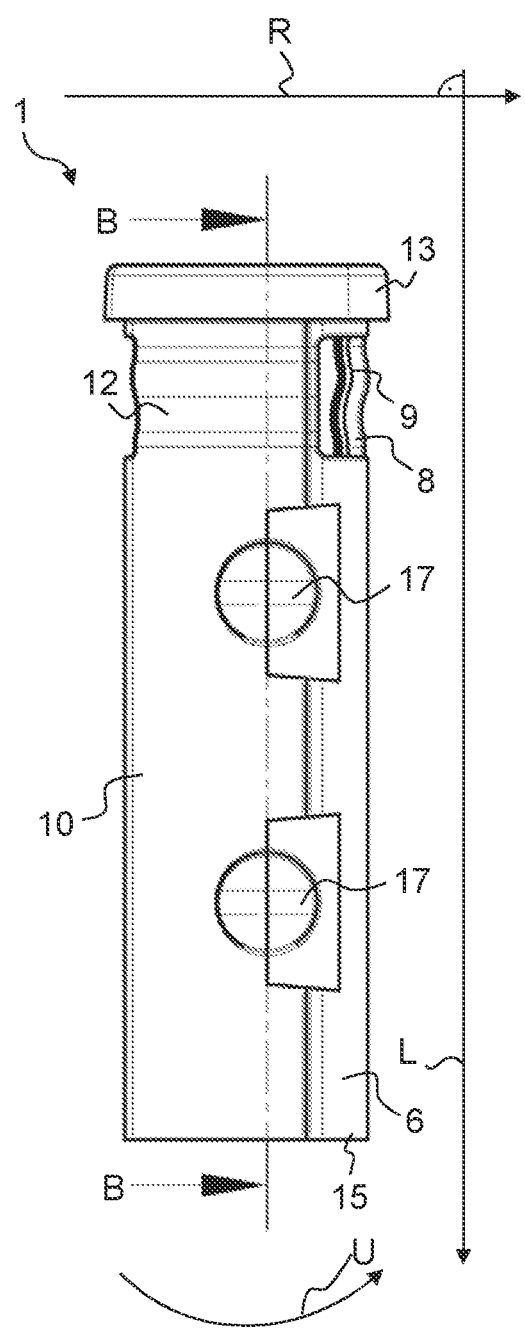
FIG. 10 shows another perspective view of the stabilizing device according to FIG. 1.
Figure 11:
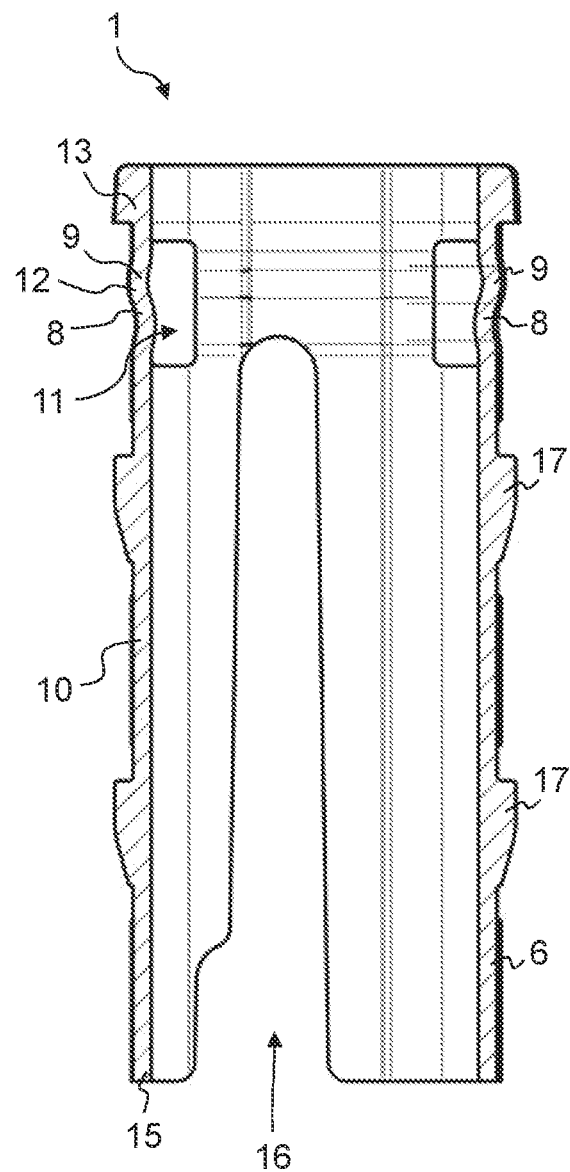
FIG. 11 shows a sectional view of the stabilizing device according to FIG. 10 along the line B-B.
Figure 12:
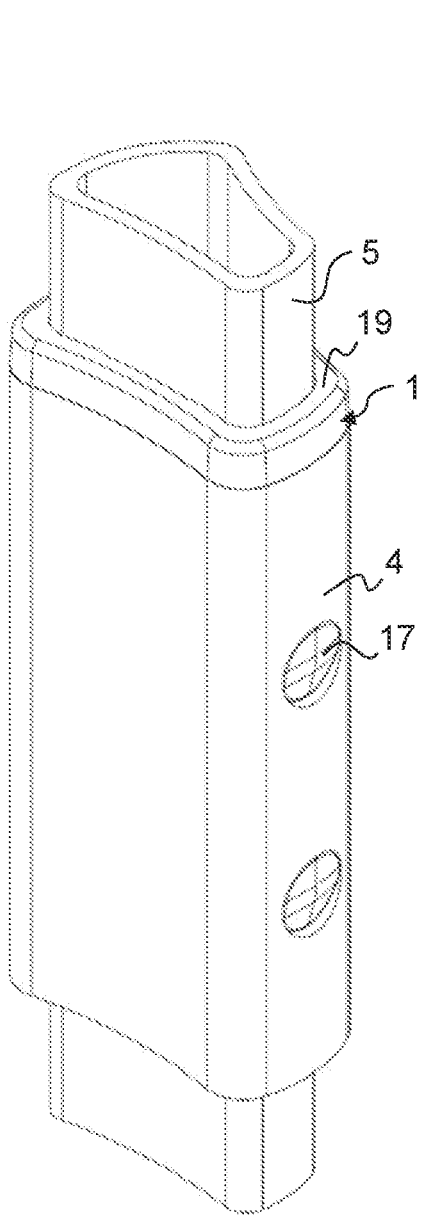
FIG. 12 shows a perspective partial view of the inner handle element, the outer handle element and the stabilizing device according to FIG. 1.

In this context and as indicated in FIGS. 14 and 15 it is preferred that a length LLI of the inner stabilizing element 8 along the longitudinal direction L of the stabilizing device 1 is about 50% or less of the entire length LD of the stabilizing device 1, preferably about 25% or less of the entire length LD of the stabilizing device 1, particularly preferably about 10% or less of the entire length LD of the stabilizing device 1 with respect to the longitudinal direction L. It is also preferred that a length LLO of the outer stabilizing element 9 along the longitudinal direction L of the stabilizing device 1 is about 50% or less of the entire length LD of the stabilizing device 1, preferably about 25% or less of the entire length LD of the stabilizing device 1, particularly preferably about 10% or less of the entire length LD of the stabilizing device 1 with respect to the longitudinal direction L. As indicated in FIGS. 6 and 7 it is furthermore preferred if a length LUI of the inner stabilizing element 8, and a length LUI of one inner stabilizing element 8 in the event of several inner stabilizing elements 8 that are for example arranged in sections, along the circumferential direction U of the stabilizing device 1 is about 75% or less of the circumferential length of the stabilizing device 1 with respect to the circumferential direction U. It is furthermore preferred if a length LUO the outer stabilizing element 9, and a length LUO of one outer stabilizing element 9 in the event of several outer stabilizing elements 9 that are for example arranged in sections, along the circumferential direction U of the stabilizing device 1 is about 75% or less of the circumferential length of the stabilizing device 1 with respect to the circumferential direction U. In addition, a preferred thickness d of the stabilizing device 1 in the region of the inner stabilizing elements) 8 and the outer stabilizing element(s) 9 is preferably between about 0.5 millimeter to 5 millimeter, more preferably between about 1 to 3 millimeter, see FIGS. 14 and 15, A length LS of the slit 16 along the longitudinal direction L of the stabilizing device 1 is preferably about 50% or more of the entire length of the stabilizing device 1, more preferably about 75% or more of the entire length of the stabilizing device 1 with respect to the longitudinal direction L of the stabilizing device 1, see FIG. 3.

The inner stabilizing element 8 and the outer stabilizing element 9 are configured resiliently. To this end it is conceivable that they are formed from a resilient material. However, it is likewise conceivable that their resilience is caused by the particular geometrical dimensions of the stabilizing device 1 as indicated above. For example, by providing the inner stabilizing element 8 and the outer stabilizing element 9 with a thickness d being smaller than their length LLI, LLO along the longitudinal direction L of the stabilizing device 1 and being smaller than their length LUI, LUO along the circumferential direction U of the stabilizing device 1, as well as with a length LLI, LLO along the longitudinal direction L of the stabilizing device 1 and with a length LUI, LUO along the circumferential direction U of the stabilizing device 1 which is in each case smaller than the entire length LD of the stabilizing device 1 along the longitudinal direction L and the circumferential length of the stabilizing device 1 along the circumferential direction U, respectively, the inner stabilizing element 8 and the outer stabilizing element 9 are rendered resilient. That is, forces that are acting on the inner stabilizing element 8 and the outer stabilizing element 9 upon an insertion of the stabilizing device 1 into the outer handle element 4 and upon insertion of the inner handle element 5 into the stabilizing device 1 are greater than a resistance of these stabilizing elements 8, 9. As a result, the inner stabilizing element 8 and the outer stabilizing element 9 are deflected. It can therefore be said that the inner stabilizing element 8 and the outer stabilizing element 9 are configured resiliently, elastically, or flexibly, respectively.

As is clearly visible in FIGS. 3, 9, 11, 14 and 15, the inner stabilizing element 8 and the outer stabilizing element 9 are arranged immediately adjacent to one another with respect to the longitudinal direction L. In addition, the inner stabilizing element 8 and the outer stabilizing element 9 are an integral part of the stabilizing device 1, in particular of the device body 6. In fact, the device body 6 comprises a sheathing wall 10, and the inner stabilizing element 8 and the outer stabilizing element 9 are formed as projections of the sheathing wall 10. In this context, it should be noted that all components of the stabilizing device 1 can be provided as a single-piece element. For example, also the rim 13 mentioned above as well as the projections 17 of the stabilizing device 1 that allow a releasable connection with the outer handle element 4 can be formed integrally, i.e. in one piece with the other components of the stabilizing device 1. The inner stabilizing element 8 and the outer stabilizing element 9 in the form of the projections of the sheathing wall 10 correspond to a deformation or curvature 29 of the sheathing wall 10. When seen in the sectional view said deformation or curve 29 has approximately an "S"-shaped configuration, wherein one arc of the "S"-shaped sheathing wall 10 provides the inner stabilizing element 8 and the other arc of the "S"-shaped sheathing wall 10 provides the outer stabilizing element 9. Hence, said arcs, and therefore the inner and outer stabilizing elements 8, 9, are provided by the curved or deformed sheathing wall 10. In other words, the curvature 29 can be said to comprises a first curved region 30 extending along the radial direction R radially outward and a second curved region 31 extending along the radial direction R radially inward, and wherein the outer stabilizing element 9 is provided by the first curved region 30 and the inner stabilizing element 8 is provided by the second curved region 31.

To this end and as follows from FIGS. 14 and 15, the inner stabilizing element 8 is provided by the second curved region 31 whose curved or deformed inner surface 20 of the sheathing wall 10 faces towards the opening 7 of the device body 6. The outer stabilizing element 9 however is provided by the first curved region 30 whose curved or deformed outer surface 21 of the sheathing wall 10 lies opposite to said inner surface 20 and the opening 7 of the device body 6.

As indicated in FIG. 14, when seen from the proximal end 19 of the stabilizing device 1 towards the distal end 15 of the stabilizing device 1 the first curved region 30 extends outwards from a central axis m of the sheathing wall 10 at a first angle of curvature α1 of about 45°. The first angle of curvature α1 is defined here as the angle that is formed between the central axis m and a fictitious line extending through a first point po1 on the central axis m and through a second point po1 on the outer surface 21 of the sheathing wall 10, the first point po1 being located where a lateral distance between the central axis m and the outer surface 21 in the region of the first curved region 30 is minimal and the second point po2 being located where a lateral distance between the central axis m and the outer surface 21 in the first curved region 30 is maximal. When seen from the distal end 15 of the stabilizing device towards the proximal end 19 of the stabilizing device the second curved region 31 extends inwards from the central axis m at a second angle of curvature α2 of about 45°, as well. The second angle of curvature α2 is defined here as the angle that is formed between the central axis m and a further fictitious line extending through a further first point pi1 on the central axis m and a second point pi1 on the inner surface 20 of the sheathing wall 10, the further first point pi1 being located where a lateral distance between the central axis m and the inner surface 20 in the region of the second curved region 31 is minimal and the second point pi1 being located where a lateral distance between the central axis m and the inner surface 20 in the second curved region 31 is maximal. Here, the first curved region 30 is formed after a first linear region 32 of the sheathing wall 10 and the second curved region 31 is formed before a second linear region 33 of the sheathing wall 10 when seen from the proximal end 19 of the stabilizing device 1 towards the distal end 15 of the stabilizing device 1.

The arrangement and configuration of the inner stabilizing element 8 and of the outer stabilizing element 9 is in each case such that, in the installed position, the inner stabilizing element 8 and the outer stabilizing element 9 are pre-stressed. This shall be further explained with respect to FIGS. 14 and 15.

Namely, and as follows from illustrative FIG. 14, a lateral distance ao of the outer stabilizing element 9 from a central axis m running centrally through the sheathing wall 10 and parallel to the longitudinal direction L is larger than a lateral distance aho of an inner surface 22 of the outer handle element 4 from said central axis m. Likewise, a lateral distance ai of the inner stabilizing element 8 from this central axis m is larger than a lateral distance ahi of an outer surface 23 of the inner handle element 5 from said central axis m. Consequently, in the actual installed position as depicted in FIG. 15, the outer stabilizing element 9 is deflected or pressed radially inwardly towards the opening 7 of the device body 6 by the inner surface 22 of the outer handle element 4, and the inner stabilizing element 8 is deflected or pressed radially outwardly away from the opening 7 of the device body 6 by the outer surface 23 of the inner handle element 5. In this state, the outer handle element 4 exerts a pressing force onto the outer stabilizing element 9 which runs opposite to a pressing force that is exerted by the inner handle element 5 onto the inner stabilizing element 8, and vice versa. At the same time, the inner stabilizing element 8 exerts a tension force onto the outer surface 23 of the inner handle element 5 and the outer stabilizing element 9 exerts a tension force onto the inner surface 22 of the outer handle element 9 as a consequence of their deflection. As a result, a wobbling of the handle elements 4, 5 within one another such as a tilting or rotation with respect to one another is prevented. As follows from a comparison of FIGS. 14 and 15, it can therefore be said that the inner stabilizing element 8 is configured such that in an uninstalled position the inner stabilizing element 8 extends radially inwards along the radial direction R by a first length LI1 and in the installed position the inner stabilizing element 8 extends radially inwards along the radial direction R by a second length LI2 being smaller than the first length LI1. Likewise, it can be said the outer stabilizing element 9 is configured such that in the uninstalled position the outer stabilizing element 9 extends radially outwards along the radial direction R by a first length LO1 and in the installed position the outer stabilizing element 9 extends radially outwards along the radial direction R by a second length LO2 being smaller than the first length LO1. Moreover, in this installed position, the angles of curvature α1, α2 are smaller than in the uninstalled position.

Furthermore, in the present example and in the uninstalled position, the first length LI1 associated with the inner stabilizing element 8 equals to the first length LO1 associated with the outer stabilizing element 9. Furthermore, in the installed position, the second length LI2 associated with the inner stabilizing element 8 equals to the second length LO2 associated with the outer stabilizing element 9. That is, the inner stabilizing element 8 and the outer stabilizing element 9 can be seen as mirror images to one another.

As mentioned initially, FIGS. 16 to 23 depict a second embodiment of a stabilizing device 1 in accordance with the present invention. This stabilizing device 1 differs from the stabilizing device 1 according to FIGS. 2 to 15 essentially in that the inner stabilizing element 8' and the outer stabilizing element 9' are provided separated from one another, whereas the inner stabilizing element 8 and the outer stabilizing element 9 according to FIGS. 2 to 15 are formed as a single-piece element.

Figure 21:
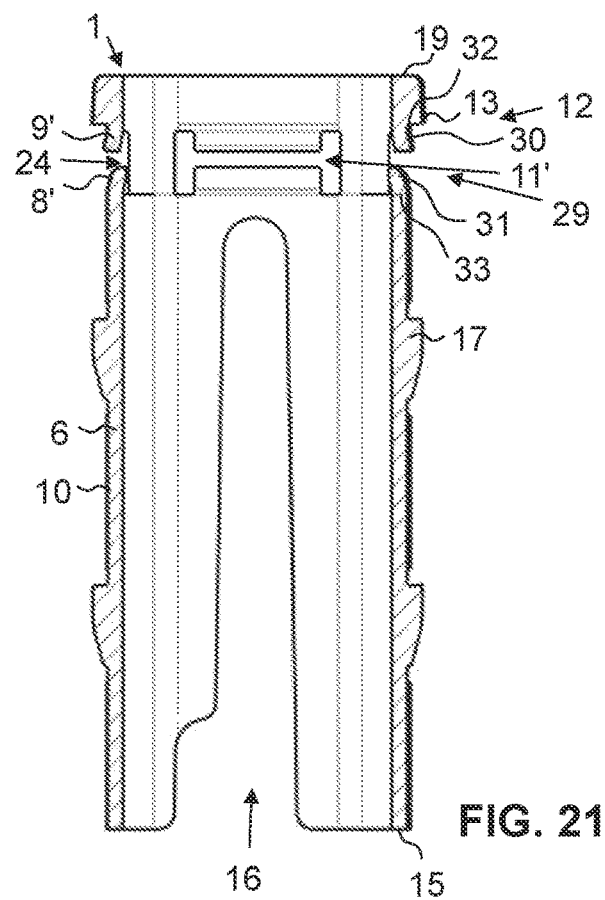
FIG. 21 shows a sectional view of the stabilizing device according to FIG. 20 along the line D-D.
Figure 22:
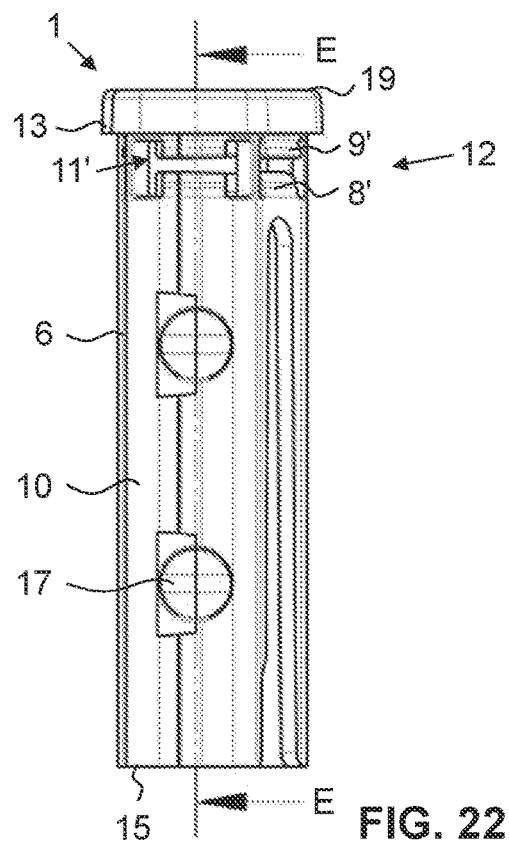
FIG. 22 shows another perspective view of the stabilizing device according to FIG. 16.
Figure 23:
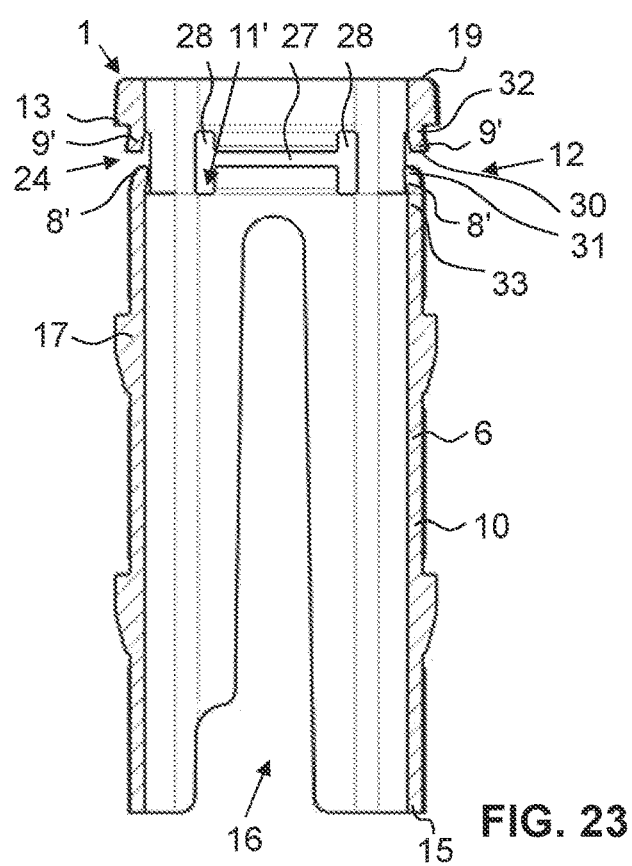
FIG. 23 shows a sectional view of the stabilizing device according to FIG. 22 along the line E-E.

In fact, whereas the inner and outer stabilizing elements 8, 9 according to the first embodiment are provided by means of the curved or deformed sheathing wall 10, said sheathing wall 10 is interrupted between the inner stabilizing element 8' and the outer stabilizing element 9' according to the second embodiment. Consequently, and as best seen in FIGS. 17, 21 and 23, the inner stabilizing element 8' extends with respect to a distal direction D running parallel to the longitudinal direction L and from the proximal end 19 of the stabilizing device 1 towards the distal end 15 of the stabilizing device 1 increasingly radially outwards, whereas the outer stabilizing element 9' extends with respect to a proximal direction P running opposite to the distal direction D increasingly radially inwards. Moreover, a gap 24 is formed between a free end 25 of the inner stabilizing element 8' and a free end 26 of the outer stabilizing element 9'. Said gap 24 results in a less strong friction force being established between the inner stabilizing element 8' and the inner handle element 5 and between the outer stabilizing element 9' and the outer handle element 5 in the installed position as compared to the friction force being established between the stabilizing elements 8, 9 according to the first embodiment and the handle elements 4, 5 in the installed position. Apart from said gap 24, however, the curvature 29 of the sheathing wall 10 according to this second embodiment corresponds to the curvature 29 of the sheathing wall 10 that has been discussed with respect to the first embodiment such that reference is made to the above explanations.

Another difference between the stabilizing devices 1 according to the first embodiment and the second embodiment lies in the design of the recesses 11, 11'. Namely, in the embodiment according to FIGS. 16 to 23 the recess 11' has the shape of an "H" when seen in cross-section, whereas the recess 11 according to FIGS. 2 to 15 essentially has a rectangular shape when seen in cross-section. That is, when seen in cross-section the recess 11' according to the second embodiment has an essentially rectangular middle portion 27 with two oppositely arranged widened end portions 28, wherein said end portions 28 extend along both the proximal direction P as well as along the distal direction D away from said middle portion 27. A length of said end portions 28 along the longitudinal direction L essentially equals the length of the recess 11 of the stabilizing device 1 according to the first embodiment along the longitudinal direction L. However, an expansion of the recess 11' in the circumferential direction U is larger than an expansion of the recess 11 in the circumferential direction U according to the first embodiment.

The invention claimed is:

1. A stabilizing device for a telescopic handle, the telescopic handle comprising at least an outer handle element and an inner handle element that is insertable into the outer handle element, wherein the stabilizing device comprises:
- a device body extending along a longitudinal direction of the stabilizing device and comprising an opening; and
- at least an inner stabilizing element and at least an outer stabilizing element;
  - wherein the stabilizing device is configured such that the inner handle element is at least partially insertable into the opening of the device body,
  - wherein the stabilizing device is further configured to be at least partially insertable into the outer handle element,
- wherein the inner stabilizing element and the outer stabilizing element are configured such that, in an installed position, wherein the inner handle element is at least partially inserted into the stabilizing device and the stabilizing device is at least partially inserted into the outer handle element, the inner stabilizing element acts on the inner handle element and the outer stabilizing element acts on the outer handle element,
- wherein the inner stabilizing element is configured such that, in the installed position, the inner stabilizing element is pre-tensioned or pre-stressed against the inner handle element,
- wherein the outer stabilizing element is configured such that, in the installed position, the outer stabilizing element is pre-tensioned or pre-stressed against the outer handle element; and
- wherein, in addition to the inner stabilizing element and the outer stabilizing element, the stabilizing device comprises at least one of the following:
  - i) at least one of a snap-connection or latching connection, or
  - ii) one or more projections that are insertable into one or more corresponding slots provided on the outer handle element.

2. The stabilizing device according to claim 1, wherein at least one of:
  - i) the inner stabilizing element is configured to enter at least one of a friction fit or a force fit with the inner handle element, or
  - ii) the outer stabilizing element is configured to enter at least one of a friction fit or a force fit with the outer handle element.

3. The stabilizing device according to claim 1, wherein at least one of:
  - i) the inner stabilizing element extends with respect to a radial direction running perpendicularly to the longitudinal direction radially inwards, or
  - ii) the outer stabilizing element extends with respect to the radial direction radially outwards.

4. The stabilizing device according to claim 3, wherein at least one of:
  - i) the inner stabilizing element is configured such that in an uninstalled position the inner stabilizing element extends radially inwards along the radial direction by a first length and in the installed position the inner stabilizing element extends radially inwards along the radial direction by a second length being smaller than the first length, or
  - ii) the outer stabilizing element is configured such that in the uninstalled position the outer stabilizing element extends radially outwards along the radial direction by a first length and in the installed position the outer stabilizing element extends radially outwards along the radial direction by a second length being smaller than the first length.

5. The stabilizing device according to claim 1, wherein at least one of:
  - i) the inner stabilizing element and the outer stabilizing element are arranged immediately adjacent to one another with respect to the longitudinal direction, or
  - ii) at least one of the inner stabilizing element or the outer stabilizing element is/are an integral part of the stabilizing device or
  - iii) the inner stabilizing element and the outer stabilizing element are formed as a single-piece element or wherein the inner stabilizing element and the outer stabilizing element are provided separated from one another.

6. The stabilizing device according to claim 5, wherein at least one of the inner stabilizing element or the outer stabilizing element is/are an integral part of the device body.

7. The stabilizing device according to claim 1, wherein the device body comprises a sheathing wall that defines a curvature along the longitudinal direction, wherein the curvature comprises at least a first curved region extending along the radial direction radially outward and at least a second curved region extending along the radial direction radially inward, and wherein the outer stabilizing element is provided by the first curved region and the inner stabilizing element is provided by the second curved region.

8. The stabilizing device according to claim 7, wherein at least one of:
  - i) the first curved region extends outwards from a central axis of the sheathing wall at a first angle of curvature of between 10° and 90° or between 20° and 50°, or
  - ii) the second curved region extends inwards from the central axis at a second angle of curvature of between 10° and 90° or between 20° and 50°.

9. The stabilizing device according to claim 1, wherein at least one of the inner stabilizing element or the outer stabilizing element is configured resiliently.

10. The stabilizing device according to claim 1, wherein at least one of:
  - i) at least one of the inner stabilizing element or the outer stabilizing element extend at least partially around a circumferential direction of the stabilizing device or
  - ii) at least one of the inner stabilizing element or the outer stabilizing element is arranged in sections with respect to the circumferential direction of the stabilizing device.

11. The stabilizing device according to claim 1, wherein the stabilizing device comprises in the region of at least one of the inner stabilizing element or of the outer stabilizing element one or more recesses.

12. The stabilizing device according to claim 1, wherein at least of:
  - i) at least one of the inner stabilizing element or the outer stabilizing element are arranged in a proximal region of the stabilizing device or
  - ii) an abutment element is arranged in the proximal region of the stabilizing device, and wherein the abutment element is configured to abut against an upper surface of the outer handle element when the stabilizing device is at least partially inserted into the outer handle element.

13. The stabilizing device according to claim 1, wherein at least one slit extends from a distal end of the stabilizing device at least partially through the device body along the longitudinal direction.

14. The stabilizing device according to claim 13, wherein the slit extends at least partially into the proximal region of the stabilizing device.

15. The stabilizing device according to claim 1, wherein the stabilizing device is configured to be connected to the handle.

16. A telescopic handle for a piece of luggage comprising a stabilizing device as claimed in claim 1.

17. The handle according to claim 16, wherein the handle comprises at least one outer handle element and at least one inner handle element that is at least partially received in the outer handle element, and wherein the stabilizing device is arranged between the inner handle element and the outer handle element with respect to a radial direction running perpendicularly to the longitudinal direction of the stabilizing device.

18. The handle according to claim 17, wherein the inner handle element comprises an outer surface and the outer handle element comprises an inner surface, and wherein at least one of:
   i) the inner stabilizing element is pre-tensioned or pre-stressed against the outer surface of the inner handle element or
   ii) the outer stabilizing element is pre-tensioned or pre-stressed against the inner surface of the outer handle element.

19. The handle according to claim 17, wherein a contour of the stabilizing device corresponds to at least one of a contour of the inner handle element or a contour of the outer handle element.

20. A piece of luggage comprising a handle as claimed in claim 16.

21. A piece of luggage comprising a stabilizing device as claimed in claim 1.

22. The stabilizing device according to claim 1, wherein the telescopic handle is of a piece of luggage.

23. The stabilizing device according to claim 1, wherein at least one of:
   i) the inner stabilizing element is configured such that, in the installed position, the inner stabilizing element is pre-tensioned or pre-stressed against an outer surface of the inner handle element, or
   ii) the outer stabilizing element is configured such that, in the installed position, the outer stabilizing element is pre-tensioned or pre-stressed against an inner surface of the outer handle element.

24. The stabilizing device according to claim 1, wherein, in the installed position, the inner stabilizing element engages the inner handle element through a sliding friction fit in the longitudinal direction and the outer stabilizing element engages the outer handle element through a sliding friction fit in the longitudinal direction.

25. A method of producing a stabilizing device for a telescopic handle, the telescopic handle comprising at least an outer handle element and an inner handle element that is insertable into the outer handle element the method comprising the steps of:
   providing a device body that extends along a longitudinal direction of the stabilizing device and that comprises an opening; and
   providing at least an inner stabilizing element and at least an outer stabilizing element;
   wherein the stabilizing device is configured such, that the inner handle element is at least partially insertable into the opening of the device body,
   wherein the stabilizing device is further configured to be at least partially insertable into the outer handle element,
   wherein the inner stabilizing element and the outer stabilizing element are configured such that, in an installed position, wherein the inner handle element is at least partially inserted into the stabilizing device and the stabilizing device is at least partially inserted into the outer handle element, the inner stabilizing element acts on the inner handle element and the outer stabilizing element acts on the outer handle element,
   wherein the inner stabilizing element is configured such that, in the installed position, the inner stabilizing element is pre-tensioned or pre-stressed against the inner handle element, and
   wherein the outer stabilizing element is configured such that, in the installed position, the outer stabilizing element is pre-tensioned or pre-stressed against the outer handle element; and
   wherein, in addition to the inner stabilizing element and the outer stabilizing element, the stabilizing device comprises at least one of the following:
   i) at least one of a snap-connection or latching connection, or
   ii) one or more projections that are insertable into one or more corresponding slots provided on the outer handle element.

26. A stabilizing device for a telescopic handle, the telescopic handle comprising at least an outer handle element and an inner handle element that is insertable into the outer handle element, wherein the stabilizing device comprises:
   a device body extending along a longitudinal direction of the stabilizing device and comprising an opening; and
   at least an inner stabilizing element and at least an outer stabilizing element;
   wherein the stabilizing device is configured such that the inner handle element is at least partially insertable into the opening of the device body,
   wherein the stabilizing device is further configured to be at least partially insertable into the outer handle element,
   wherein the inner stabilizing element and the outer stabilizing element are configured such that, in an installed position, wherein the inner handle element is at least partially inserted into the stabilizing device and the stabilizing device is at least partially inserted into the outer handle element, the inner stabilizing element acts on the inner handle element and the outer stabilizing element acts on the outer handle element,
   wherein the inner stabilizing element is configured such that, in the installed position, the inner stabilizing element is pre-tensioned or pre-stressed against the inner handle element,
   wherein the outer stabilizing element is configured such that, in the installed position, the outer stabilizing element is pre-tensioned or pre-stressed against the outer handle element, and
   wherein, in addition to the inner stabilizing element and the outer stabilizing element, the stabilizing device comprises at least one of the following:
   i) at least one of a snap-connection or latching connection, or
   ii) one or more projections that are insertable into one or more corresponding slots provided on the outer handle element, and
   wherein the device body comprises a sheathing wall that defines a curvature along the longitudinal direction, wherein the curvature comprises at least a first curved region extending along the radial direction radially outward and at least a second curved region extending along the radial direction radially inward, and wherein the outer stabilizing element is provided by the first curved region and the inner stabilizing element is provided by the second curved region, and wherein a gap is present between the inner stabilizing element and the outer stabilizing element.

* * * * *